United States Patent [19]

Ando et al.

[11] Patent Number: 4,685,434

[45] Date of Patent: Aug. 11, 1987

[54] ELECTRIC CONTROL APPARATUS FOR CARBURETOR

[75] Inventors: Tsuneo Ando; Kazusato Kasuya; Takeru Yasuda; Yukitoshi Asada, all of Oobu, Japan

[73] Assignee: Aisan Kogyo Kabushiki Kaisha, Oobu, Japan

[21] Appl. No.: 807,663

[22] Filed: Dec. 11, 1985

[30] Foreign Application Priority Data

Dec. 12, 1984 [JP] Japan .................................. 59-261994
Oct. 28, 1985 [JP] Japan .................................. 60-240943

[51] Int. Cl.$^4$ ............................................. F02D 41/00
[52] U.S. Cl. .............................. 123/438; 251/129.11; 318/685
[58] Field of Search ............... 123/438, 571, 585, 339; 251/129.11; 318/685, 696

[56] References Cited

U.S. PATENT DOCUMENTS 4,229,387 10/1980 Rogerson et al. .................... 123/438
4,376,430 3/1983 Takada et al. ...................... 123/438

OTHER PUBLICATIONS

"Internal Combustion Engine", vol. 22, No. 281 (pp. 29 to 36) published by Kabushiki kaisha Sankai-do In Japan on Aug. 1, 1983.

Primary Examiner—Andrew M. Dolinar
Attorney, Agent, or Firm—Berman, Aisenberg & Platt

[57] ABSTRACT

In a carburetor having a flow control element axially movable within an air bleed passage in the carburetor body for controlling the cross-sectional area of the passage and a stepper motor on the body for effecting axial movement of the control element, an input circuit produces an electric signal indicative of the operating condition of an engine. A computer determines rotary steps of the motor in response to the electric signal for optimizing the cross-sectional area of the passage in relation to the operating condition of the engine, an a whether the number of the determined rotary steps is more than the actual rotary steps of the motor. A first command signal and a second command signal, and first and second control signals are produced respectively for effecting one rotary step of the motor in a direction defined by each of the command signals. The computer is responsive to one of the control signals to measure a first time duration for one rotary step of the motor to produce a first time signal upon lapse of the first time duration, responsive to change of one of the command signals to the other to measure a second time duration for one reverse rotary step of the motor to produce a second time signal upon lapse of the second time duration, and further responsive to one of the time signals to selectively apply the control signals to the motor.

7 Claims, 25 Drawing Figures

4,685,434

ELECTRIC CONTROL APPARATUS FOR CARBURETOR

BACKGROUND OF THE INVENTION

The present invention relates to an electric control apparatus for a carburetor adapted to internal combustion engines, and more particularly to an electric control apparatus for a carburetor which comprises a body formed therein with an intake conduit, a flow control element axially movable within a passage such as an air bleed passage in the body for controlling the cross-sectional area of the passage in accordance with axial displacement thereof, and a stepper motor mounted on the body for effecting the axial displacement of the flow control element in accordance with the operating condition of the engine.

In such an electric control apparatus as described above, it is required to precisely control operation of the stepper motor in response to various instantaneous changes of the operating condition of the engine. It takes, however, a time inevitably for each forward or backward step motion of the stepper motor. Additionally, the time for each step motion changes in accordance with various loads acting on the stepper motor. For these reasons, if the stepper motor was applied with an electric control signal for backward or forward step motion during forward or backward motion thereof, a desired control of the stepper motor would not be effected.

SUMMARY OF THE INVENTION

It is, therefore, a primary object of the present invention to provide an electric control apparatus for a carburetor capable of controlling operation of the stepper motor as precisely as possible without any error caused by such a time delay in operation of the stepper motor as described above.

According to the present invention, the primary object is accomplished by providing an electric control apparatus for a carburetor adapted to internal combustion engines, the carburetor having a body formed therein with an intake conduit, a flow control element axially movable within a passage such as an air bleed passage in the body for controlling the cross-section area of the passage in accordance with axial displacement thereof, and a stepper motor mounted on the body for effecting the axial displacement of the flow control element, which control apparatus comprises first means for producing a first electric signal indicative of the operating condition of the engine, second means responsive to the first electric signal for determining rotary steps of the stepper motor for controlling the cross-sectional area of the passage in an optimum value in relation to the operating condition of the engine, third means for determining whether or not the number of the determined rotary steps is more than the actual rotary steps of the stepper motor and if so, producing a first command signal and if not, producing a second command signal, and fourth means responsive to the first command signal for producing a first control signal for effecting one rotary step of the stepper motor in a direction defined by the first command signal and further responsive to the second command signal for producing a second control signal for effecting one rotary step of the stepper motor in the other direction defined by the second command signal.

The electric control apparatus further comprises fifth means responsive to one of the control signals for measuring a first time duration for one rotary step of the stepper motor and for producing a first time signal upon lapse of the first time duration, sixth means responsive to change of one of the command signals to the other command signal for measuring a second time duration for one reverse rotary step of the stepper motor and for producing a second time signal upon lapse of the second time duration, and means responsive to one of the first and second time signals for selectively applying the control signals to the stepper motor.

BRIEF DESCRIPTION OF THE DRAWINGS

Additional objects, features and advantages of the present invention will become more readily apparent from the following detailed description of certain preferred embodiments thereof when taken with reference to the accompanying drawings, in which.

DETAILED DESCRIPTION OF THE PREFERRED EMBODIMENTS

Figure 1:
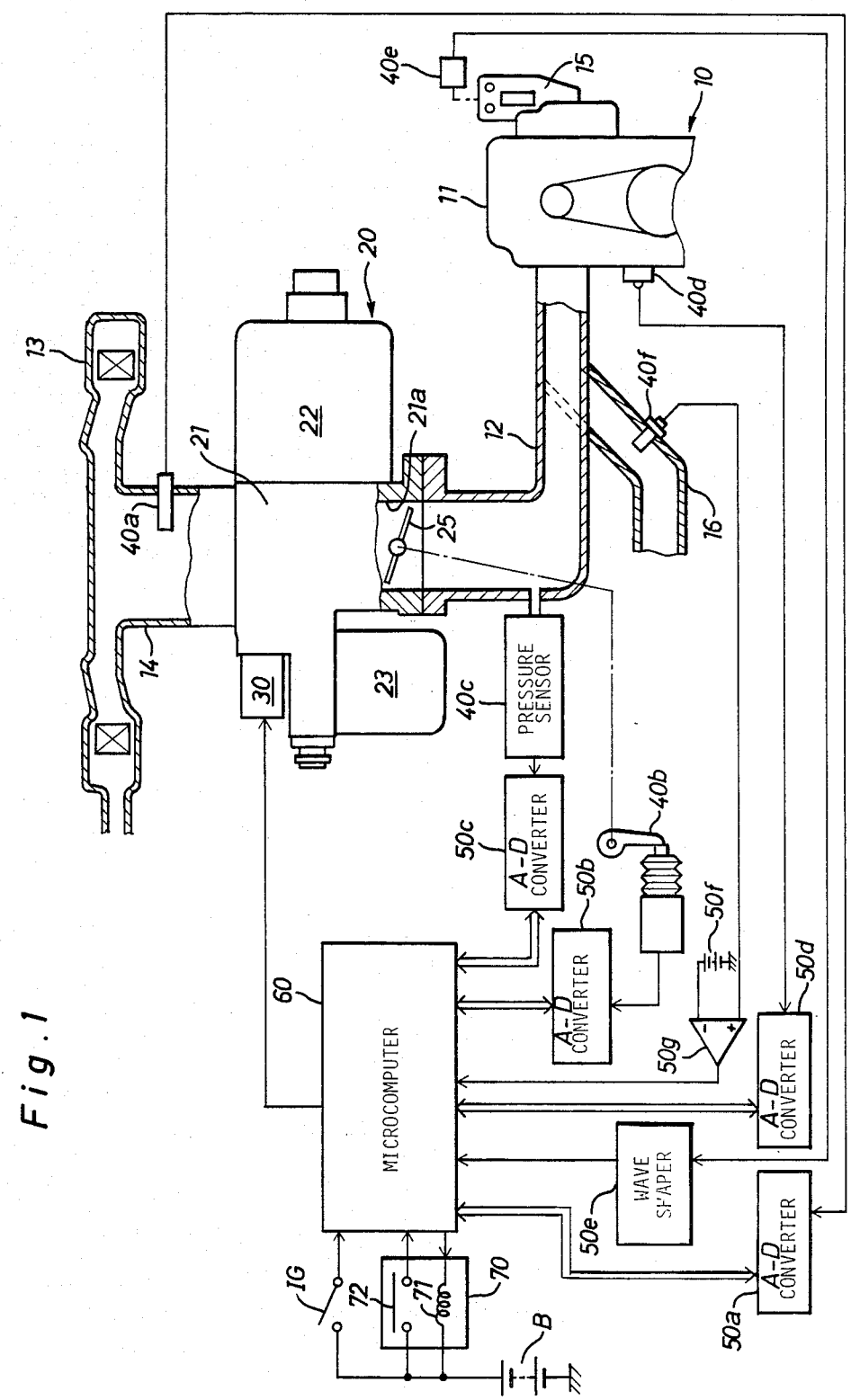
FIG. 1 is a block diagram of a first embodiment in accordance with the present invention adapted to a variable venturi type carburetor.
Figure 2:
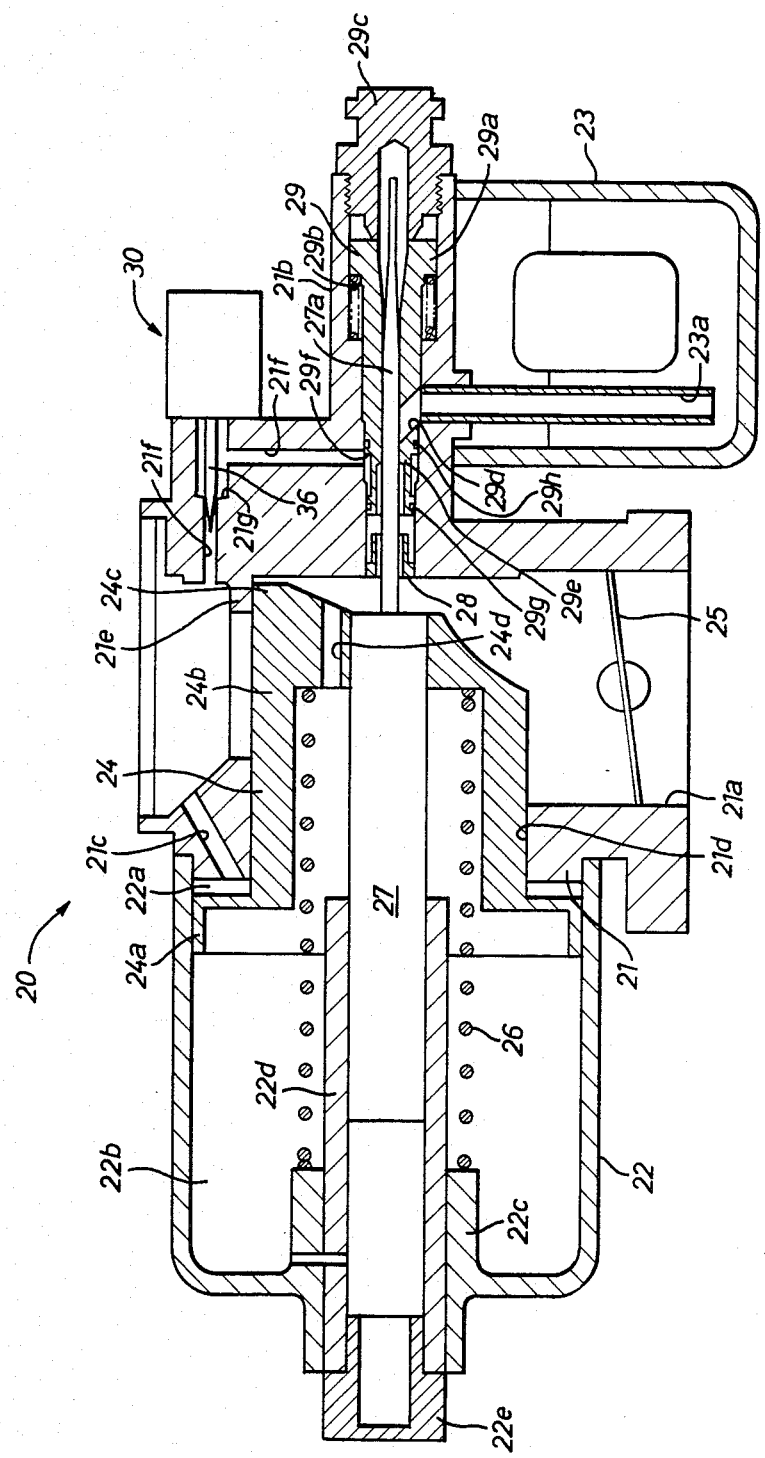
FIG. 2 is an enlarged cross-sectional view of the carburetor shown in FIG. 1.

Referring now to FIG. 1 of the drawings, there is illustrated a first embodiment of an electric control apparatus in accordance with the present invention which is adapted to a variable venturi type carburetor 20 for an internal combustion engine 10 of an automotive vehicle. The carburetor 20 comprises a body 21 which is formed therein with an intake conduit 21a. The intake conduit 21a is disposed between an outlet 14 of an air cleaner 13 and an inlet of an intake manifold 12 extending from a body 11 of engine 10. As shown in FIGS. 1 and 2, the carburetor 20 further comprises a cup-shaped casing 22 and a float chamber 23. The cup-shaped casing 22 is mounted at its opening on one side of a peripheral wall of carburetor body 21, and the float chamber 23 is assembled on an extension 21b which extends from the other side of the peripheral wall of carburetor body 21 opposite to the casing 22. As shown in FIG. 2, a cylindrical suction piston 24 is slidably disposed at its stepped annular portion 24a within the casing 22 to form air and suction chambers 22a, 22b in the casing 22. The air chamber 22a communicates with outlet 14 of air cleaner 13 through an air passage 21c which is formed in the one side of the peripheral wall of carburetor body 21.

The suction piston 24 is provided with a head 24b which is slidably inserted through an opening 21d into the intake conduit 21a perpendicularly to the axis of conduit 21a to form a variable venturi portion at its upper portion 24c with a protuberance 21e from an inner wall of the intake conduit 21a. The opening 21d is formed on the one side of the peripheral wall of carburetor body 21 between the variable venturi portion and a throttle valve 25 provided within the intake conduit 21a. The piston head 24b is provided thereon with a passage 24d to permit communication between the suction chamber 22b and the intake conduit 21a. A coil spring 26 is interposed between an annular boss 22c of casing 22 and the piston head 24b in the suction chamber 22b to bias the piston 24 into the intake conduit 21a. In this case, the spring constant of coil spring 26 is predetermined to maintain substantially a constant negative pressure between the variable venturi portion and the throttle valve 25 during operation of engine 10.

A guide rod 27 is coaxially secured at its base to the center of piston head 24b to be slidably inserted into an annular guide member 22d which extends from the annular boss 22c of casing 22 into the suction chamber 22b. The guide rod 27 is provided at its base with a metering needle 27a extending through an annular nozzle 28 into a cylindrical member 29 which is disposed together with the nozzle 28 within the extension 21b of carburetor body 21. The cylindrical member 29 is provided at its intermediate wall portion with a radial hole 29d which communicates the interior of cylindrical member 29 with a fuel passage 23a extending into fuel in the float chamber 23. The cylindrical member 29 is further provided at its inner wall portion with an annular metering jet 29e which faces an outer periphery of the metering needle 27a to form an annular cross-sectional area. In this case, the cross-sectional area is proportional substantially to a throttle area of the variable venturi portion. The metering jet 29e is provided thereon with a radial hole 29f which communicates the interior of metering jet 29e with an air bleed passage 21f. The air bleed passage 21f is formed in the other side of the peripheral wall of carburetor body 21 and opens the upstream of the variable venturi portion. Additionally, a coil spring 29b is disposed within a stepped portion of the extension 21b to bias a flange portion of the cylindrical member 29 toward the plug 29c. In FIG. 2, the reference character 22e indicates a closure plug, and the reference characters 29g, 29h each indicate an O ring.

Figure 3:
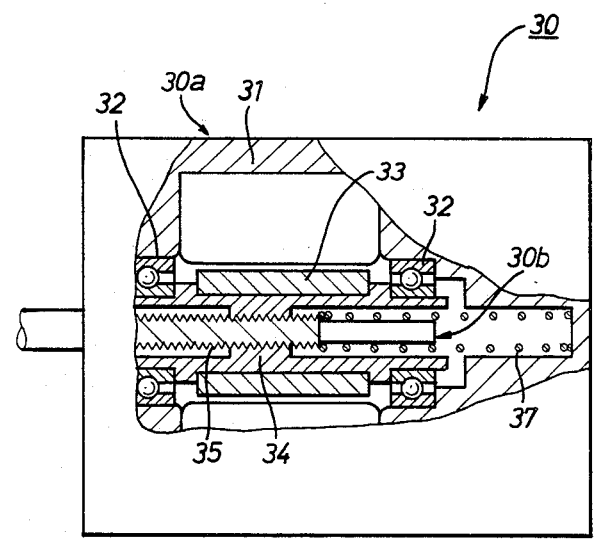
FIG. 3 is an enlarged partial broken view of the driving mechanism shown in FIG. 2.

As shown in FIGS. 1 and 2, the electric control apparatus comprises a driving mechanism 30 which is mounted on the other side of the peripheral wall of carburetor body 21. As shown in FIG. 3, the driving mechanism 30 is provided with a stepper motor 30a and with a plunger 30b which is coaxially assembled in the stepper motor 30a. The stepper motor 30a includes a stator 31 which is mounted at its one end wall on the other side of the peripheral wall of carburetor body 21. The stepper motor 30a further includes an annular rotor 33 of permanent magnet which is rotatably supported by a pair of ball bearings 32, 33 in the stator 31.

The plunger 30b has a male screw portion 35 which is threaded in an axially movable manner through a female screw portion 34 formed on an inner wall of the annular rotor 33. The plunger 30b is further provided with a needle valve body 36 (see FIG. 2) which extends through the one end wall of stator 31 into an annular valve seat 21g in a non-rotatable and axially movable manner. The valve seat 21g is formed in an intermediate portion of air bleed passage 21f. In this case, an axial displacement of the plunger 30b defines an annular cross-sectional area which is formed between the needle valve body 36 and annular valve seat 21g to correspond to the quantity of air bleed flowing through the air bleed passage 21f. As shown in FIG. 3, a coil spring 37 is interposed between a stepped portion of plunger 30b and an inside of the other end wall of stator 31 to bias the plunger 30b toward the valve seat 21g.

As shown in FIG. 1, the electric control apparatus includes various sensors 40a to 40f, A-D converters 50a, 50b, 50c and 50d connected respectively to the air temperature sensor 40a, throttle sensor 40b, negative pressure sensor 40c and water temperature sensor 40d, a wave shaper 50e connected to the angular sensor 40e, and a comparator 50g connected to the oxygen concentration sensor 40f and a reference signal generator 50f. The air temperature sensor 40a detects the actual temperature of an air flow in the outlet 14 of air cleaner 13 to generate an analog air temperature signal indicative of the detected temperature of the air flow. The throttle sensor 40b detects the actual opening degree of throttle valve 25 to generate an analog throttle signal indicative of the detected opening degree of throttle valve 25. The negative pressure sensor 40c detects the actual negative pressure in the intake manifold 12 to generate an analog negative pressure signal indicative of the detected negative pressure. The water temperature sensor 40d detects the actual temperature of water in a coolant system of engine 10 to generate an analog coolant temperature signal indicative of the detected water temperature. The angular sensor 40e detects the actual rotation angle of a camshaft within a distributor 15 of engine 10 to generate an angular signal indicative of the actual rotation angle of engine 10. The oxygen concentration sensor 40f detects the actual oxygen concentration of exhaust gases in an exhaust pipe 16 of engine 10 to generate an analog concentration signal indicative of the detected oxygen concentration.

The A-D converter 50a digitally converts the analog air temperature signal from air temperature sensor 40a into a digital air temperature signal, and the A-D converter 50b digitally converts the analog throttle signal from throttle sensor 40b into a digital throttle signal. The A-D converter 50c digitally converts the analog negative pressure signal from negative pressure sensor 40c into a digital negative pressure signal, and the A-D converter 50d digitally converts the analog coolant temperature signal from water temperature sensor 40d into a digital coolant temperature signal. The wave shaper 50e reshapes the angular signal from angular sensor 40e into a reshaped angular signal. The reference signal generator 50f acts to produce a reference signal indicative of a predetermined concentration of oxygen for defining the stoichiometric air-fuel ratio of the mixture. The comparator 50g compares the analog concentration signal from sensor 40f with the reference signal from reference signal generator 50f to generate a comparison signal at a high level (or a low level) when a level of the concentration signal is higher (or lower) than that of the reference signal. In this case, the high level (or low level) of the comparison signal from comparator 50g represents the fact that the mixture to be adjusted in the carburetor 20 is rich (or lean).

The electric control apparatus further comprises a microcomputer 60 which is connected to the A-D converters 50a to 50d, wave shaper 50e and comparator 50g and also connected to a DC source B of electricity through an ignition switch IG of the vehicle engine and a relay 70. The microcomputer 60 has a read only memory or ROM which previously stores a main control program defined by a flow diagram shown in FIG. 4 and also stores first and second interrupt control programs defined by flow diagrams shown in FIGS. 5 and 6 respectively. In operation, the microcomputer 60 cooperates with the A-D converters 50a–50d, wave shaper 50e and comparator 50g to perform the main and interrupt control programs so as to control the stepper motor 30a and relay 70, as described later. The relay 70 includes an electromagnetic coil 71 and a normally open switch 72 which is closed in response to energization of the coil 71 to permit therethrough power supply from DC source B of electricity to the microcomputer 60. In the embodiment, execution of the first interrupt control program is initiated at each time when a timer in the microcomputer 60 completes measurement of a predetermined time, for instance, one(msec). Meanwhile, execution of the second interrupt control program is initiated when the power supply from DC source B of electricity to the microcomputer 60 through the ignition switch IG is inhibited in response to opening of ignition switch IG.

OPERATION

Assuming that the ignition switch IG is closed to drive the engine 10 and that the vehicle starts under the actual opening degree of throttle valve 25 caused by depression of an accelerator pedal of the vehicle, the suction piston 24 is moved by a difference between the biasing force of coil spring 26 and the negative pressure which is applied to the suction chamber 22b in accordance with the actual opening degree of throttle valve 25. This varies a cross-sectional area of the variable venturi portion. Then, the air from air cleaner 13 is sucked into the intake conduit 21a through the variable venturi portion, and fuel in float chamber 23 is sucked into the conduit 21a through the fuel passage 23a, radial hole 29d, metering jet 29e and nozzle 28. Thereafter, the sucked air and fuel are mixed in the intake conduit 21a and then sucked into a combustion chamber of engine body 11. Finally, the air-fuel mixture is burned in the combustion chamber and exhausted into the exhaust pipe 16 as exhaust gases.

Figure 4:
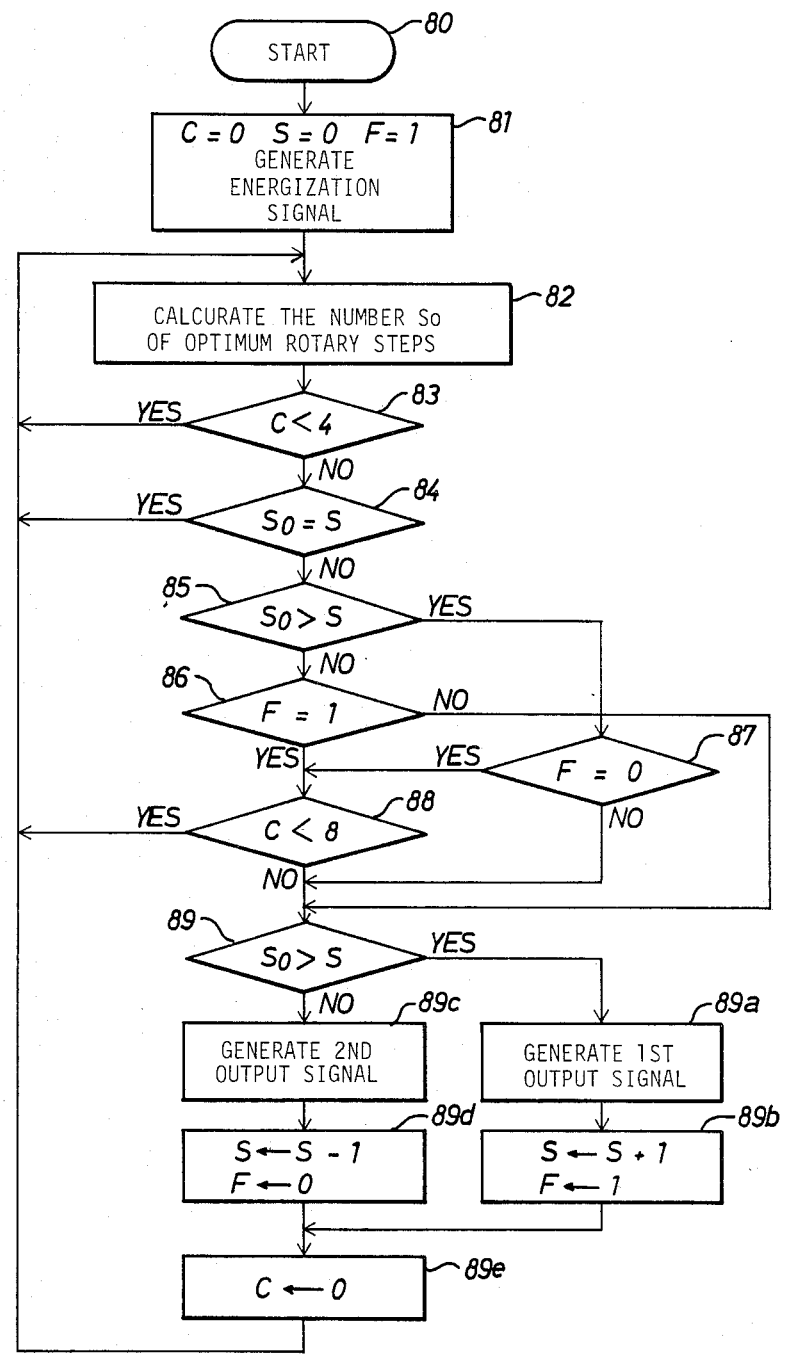
FIGS. 4 to 6 are flow diagrams respectively defining main control program and first and second interrupt control programs to be performed by the microcomputer in FIG. 1.

When the ignition switch IG is closed, as previously described, the microcomputer 60 is ready for operation and starts execution of the main control program at step 80 of the flow diagram in FIG. 4 to be initialized at the following step 81. At this initialization, the microcomputer 60 clears a timer count data C equal to zero and also clears the number S of the actual rotary steps of stepper motor 30a equal to zero. Furthermore, the microcomputer 60 resets a flag F equal to one and then produces an energization signal for energizing the electromagnetic coil 71 of relay 70. In this case, the number S of the actual rotary steps takes zero when the plunger 30b is maintained in an original position. The number S of the actual rotary steps increases in accordance with increase in a length of displacement of the plunger 30b against the biasing force of coil spring 37. Additionally, the timer of microcomputer 60 starts measurement of the predetermined time in response to operation of microcomputer 60 and is reset upon completion of the measurement to restart the same measurement.

When the energization signal appears from the microcomputer 60, as previously described, the electromagnetic coil 71 of relay 70 is energized to close the switch 72 so as to hold power supply from the DC source B of electricity to the microcomputer 60 through the switch 72. When the main control program proceeds to step 82, the microcomputer 60 calculates the number So of optimum rotary steps of stepper motor 30a based on the following equation (1) in accordance with a digital air temperature signal from A-D converter 50a, a digital throttle signal from A-D converter 50b, a digital negative pressure signal from A-D converter 50c, a digital water temperature signal from A-D converter 50d, reshaped angular signals from wave shaper 50e and a comparison signal from comparator 50g.

$$S_o = S_b + A_f + A_w + A_a + A_p \qquad (1)$$

wherein $S_b$ indicates the number of basic rotary steps of stepper motor 30a corresponding with the basic quantity of air bleed flowing through the air bleed passage 21f, wherein $A_f$ indicates the number of rotary steps of stepper motor 30a to be modified in accordance with oxygen concentration in the exhaust gases under feedback control of stepper motor 30a, wherein $A_w$ indicates the number of rotary steps of stepper motor 30a to be modified in accordance with an engine coolant temperature, wherein $A_a$ indicates the number of rotary steps of stepper motor 30a to be modified in accordance with a temperature of the air flow, and wherein $A_p$ indicates the number of rotary steps of stepper motor 30a to be modified in accordance with the negative pressure.

In the above calculation, the actual rotation speed N of engine 10 is calculated on a basis of the reshaped angular signals from wave shaper 50e, and the number $S_b$ of basic rotary steps is calculated in accordance with the calculated rotation speed N and a value of the digital negative pressure signal from A-D converter 50c on a basis of a basic map representing a relationship among the number $S_b$ of basic rotary steps, rotation speed N and negative pressure in intake manifold 12. Then, the number $A_f$ of rotary steps is determined on a basis of a value of the digital throttle signal from A-D converter 50b in relation to a level of the comparison signal from comparator 50g, the number $A_w$ of rotary steps is determined on a basis of a value of the digital water temperature signal from A-D converter 50d, the number $A_a$ of rotary steps is determined on a basis of a value of the digital air temperature signal from A-D converter 50a, and the number $A_p$ of rotary steps is determined on a basis of a value of the digital negative pressure signal from A-D converter 50c. Thereafter, the number $S_o$ of optimum rotary steps is calculated in accordance with the respective numbers $S_b$, $A_f$, $A_w$, $A_a$ and $A_p$ on a basis of the equation (1). In addition, the equation (1) and basic map are previously stored in the ROM of microcomputer 60.

Figure 5:
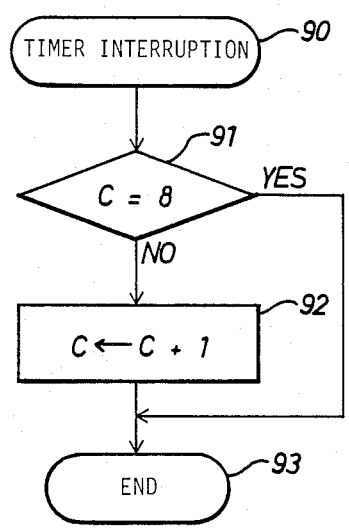
Figure 6:
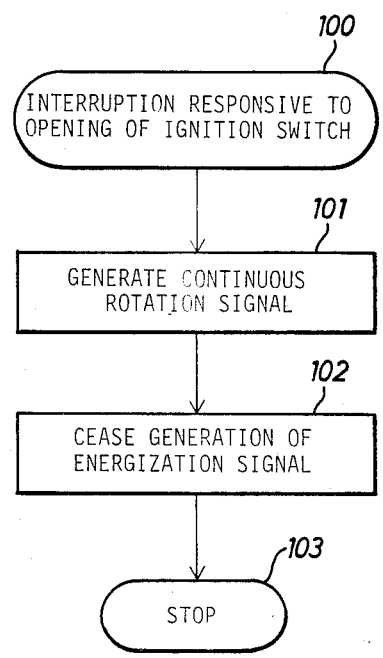

When the timer of microcomputer 60 completes measurement of the predetermined time during repetitive execution at steps 82, 83, the microcomputer 60 initiates execution of the first interrupt control program at step 90 in FIG. 5 to determine a "No" answer at the following step 91 on a basis of the timer count data C=0. Then, the microcomputer 60 increments the timer count data C by one and sets the same data C equal to the decremented value to end the fist interrupt control program at final step 93. When the timer count data C at step 92 increases up to four during repetitive execution of the first interrupt control program, the microcomputer 60 determines a "NO" answer at step 83 of the main control program. In this case, the timer count data C=4 corresponds with a first time duration, for instance, 4 (msec) required for effecting one rotary step of stepper motor 30a in the same rotational direction.

If the number $S_o$ of optimum rotary steps calculated newly at step 82 is equal to the number S (=0) of the actual rotary steps, the microcomputer 60 determines a "YES" answer at step 84 of the main control program. If the number $S_o$ is different from the number S (=0), the microcomputer 60 determines a "NO" answer at the same step 84. If $S_o$>S at this stage, the microcomputer 60 determines a "YES" answer at the following step 85 to determine a "NO" answer at step 87 based on the flag F=1. Then, the microcomputer 60 determines a "YES" answer at step 89 based on $S_o$>S, and in turn, generates a first output signal indicative of one rotary step of stepper motor 30a in a first rotational direction. Subsequently, the microcomputer 60 increments the number S of the actual rotary steps by one at step 89b, sets the flag F=1 at the same step 89b and thereafter resets the timer count data C=0 at the following step 89e. In addition, increment of the timer count data C at step 92 of the first interrupt control program is restarted on a basis of C=0 at step 89e of the main control program.

When the first output signal appears from microcomputer 60, as previously described, the stepper motor 30a is rotated by one rotary step in the first rotational direction to rotate the female screw portion 34 in the same direction so as to move the male screw portion 35 axially against the biasing force of coil spring 37. Then, the plunger 30b is displaced to disengage the valve body 36 from the valve seat 21g. Thus, the air from air cleaner 13 flows through the air bleed passage 21f and hole 29f into the metering jet 29e in such a manner that the quantity of air bleed is defined by the annular cross-sectional area between the valve body 36 and valve seat 21g. As a result, fuel in the float chamber 23 is sucked into the intake conduit 21a through the fuel passage 23a, radial hole 29d, and nozzle 28 in such a manner that the quantity of fuel is defined by the annular cross-sectional area in the metering jet 29e.

As easily understood from the above description, the main control program is repetitively performed through the steps 82, 83, 84, 85, 87, 89, 89a, 89b and 89e in relation to the first interrupt control program to accord the incremented number S of the actual rotary steps at step 89b with the number $S_o$ of optimum rotary steps so as to increase the quantity of air bleed under control of the driving mechanism 30. In this instance, upon each lapse of the first time duration defined by repetitive determination of a "NO" answer at step 84, the microcomputer 60 performs the main control program through the steps 85, 87 and 89 to generate the first output signal at step 89a. This means that one rotary step of stepper motor 30a in the first rotational direction is effected in response to the first output signal upon each lapse of the first time duration. This means also that the number S of the actual rotary steps is increased toward the number $S_o$ of optimum rotary steps updated newly at step 82. Thus, an increase in the quantity of bleed air flowing through the air bleed passage 21f can be precisely controlled by the driving mechanism 30 in response to various changes of load condition of engine 10 to adjust in a proper value an air-fuel ratio of the mixture within the carburetor 20. This is effective to decrease exhaust of noxious gases from engine 10, to enhance driveability of the vehicle and to decrease the rate of fuel consumption.

When an answer at step 85 becomes "NO" during the above execution, the microcomputer 60 determines a "YES" answer at the following step 86 because of the flag F=1 set at step 89b and then determines a "YES" answer at step 88 because of the timer count data C=4. When the timer count data C is incremented up to eight during repetitive execution of the first interrupt control program, the microcomputer 60 determines a "YES" answer at step 91 and thereafter determines a "NO" answer at step 88 of the main control program because of C=8. In this case, the timer count data C=8 corresponds with a second time duration, for instance, 8 (msec) for effecting one reverse rotary step of stepper motor 30a. Thereafter, the microcomputer 60 determines a "NO" answer at step 89 based on $S_o$<S to generate at step 89c a second output signal indicative of one reverse rotary step of the stepper motor 30a in a second rotational direction. Then, at step 89d the microcomputer 60 decrements the number S of the actual rotary steps by one, sets the number S to the decremented resultant value and resets the flag F=0 to clear the timer count data C=0 at the following step 89e. In this instance, execution at step 92 of the first interrupt control program is restarted after the timer count data C=0 is set at step 89e of the main control program.

When the second output signal appears from the microcomputer 60, as previously described, the stepper motor 30a is rotated by one rotary step in the second rotational direction to rotate the female screw portion 34 in the same direction so as to axially move the male screw portion 35 in a biasing direction of coil spring 37. Then, the plunger 30b is displaced to decrease the annular cross-sectional area between the valve body 36 and the valve seat 21g. This means that the quantity of bleed air flowing through the air bleed passage 21f decreases in accordance with decrease of the annular cross-sectional area between the valve body 36 and the valve seat 21g. In this instance, upon lapse of the second time duration defined by determination of a "NO" answer at step 88, the microcomputer 60 performs the main control program through the step 89 to generate the second output signal at step 89c. This means that one reverse rotary step of stepper motor 30a in the second rotational direction is effected in response to the second output signal upon each lapse of the second time duration. This means also that the number S of the actual rotary steps of stepper motor 30a is decreased toward the number $S_o$ of optimum rotary steps updated newly at step 82. Thus, a decrease in the quantity of bleed air flowing through the air bleed passage 21f can be precisely controlled by the driving mechanism 30 in response to various changes of load condition of engine 10 to adjust in a proper value an air-fuel ratio of the mixture within the carburetor 20. This is effective to decrease exhaust of the noxious gases, to enhance the driveability and to decrease the rate of fuel consumption.

If $S_o$ is thereafter maintained smaller than S, the main control program is repetitively performed through the steps 82, 83, 84, 85, 86, 89, 89c, 89d and 89e in relation to the first interrupt control program to accord the number S of the actual rotary steps with the number $S_o$ of optimum rotary steps so as to decrease the quantity of bleed air under control of the driving mechanims 30.

Although in the above operation the stepper motor 30a is reversed into the second rotational direction from the first rotational direction, it may be also reversed into the first rotational direction from the second rotational direction. In such a case, the microcomputer 60 determines a "YES" answer at step 87 because of the flag F=0 reset at step 89d, if the determination at step 85 is "YES" due to $S_o > S$ during stepping motion of stepper motor 30a in the second rotational direction. When the timer count data C is incremented up to eight at step 92, the microcomputer 60 determines a "NO" answer at step 88 and then determines a "YES" answer at step 89 because of $S_o > S$ to generate a first output signal at step 89a. Thereafter, the microcomputer 60 determines a "YES" answer at step 85, determines a "NO" answer at step 87 because of F=1 determines a "YES" answer at step 89 to repeat generation of the first output signal.

When the ignition switch IG is opened at stop of the vehicle, the power supply from the DC source B of electricity to the microcomputer 60 is maintained through the closed switch 72 of relay 70. In this condition, the microcomputer 60 performs the second interrupt control program at step 100 in FIG. 6 to generate at step 101 a continuous rotation signal for decreasing the number S of the actual rotary steps of stepper motor 30a to zero. Then, the stepper motor 30a is responsive to the continuous rotation signal from microcomputer 60 to rotate in the second rotational direction. When the number S of the actual rotary steps becomes zero, the needle valve body 36 of plunger 30b seats on the valve seat 21g to close the air bleed passage 21f. When the second interrupt control program proceeds to step 102, the microcomputer 60 extinguishes the energization signal in response to which the electromagnetic coil 71 of relay 70 is deenergized to open the switch 72. Thus, the microcomputer 60 stops execution thereof at step 103.

Figure 7:
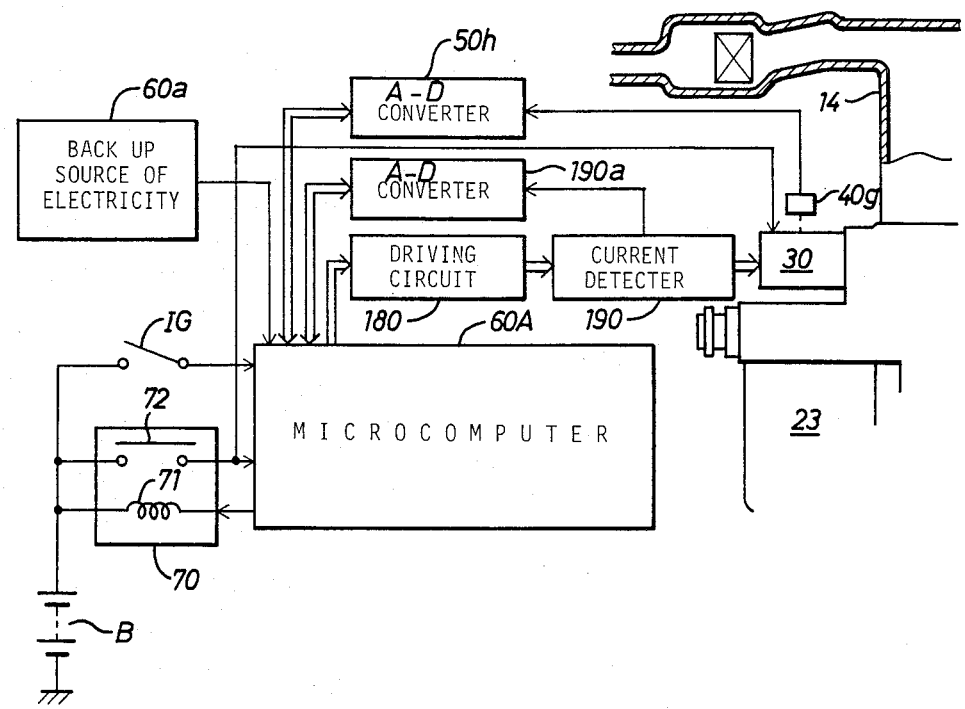
FIG. 7 is a partial block diagram of the second embodiment in accordance with the present invention.
Figure 8:
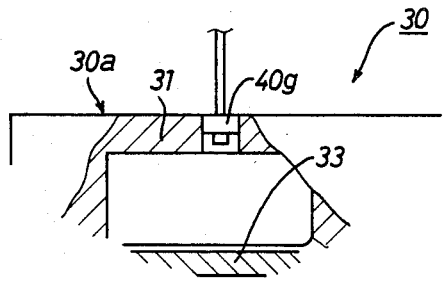
FIG. 8 is an enlarged partially broken view of the driving mechanism.

In FIG. 7, there is illustrated a second embodiment of the electric control apparatus in accordance with the present invention which is adapted to the carburetor 20 of the previous embodiment. In the second embodiment, as shown in FIG. 8, a motor temperature sensor 40g is provided on the stator 31 of stepper motor 30a of the first embodiment to detect the actual temperature t of stepper motor 30a so as to generate an analog motor temperature signal indicative of the detected temperature t. An A-D converter 50h digitally converts the analog motor temperature signal from sensor 40g into a digital motor temperature signal.

The microcomputer 60 in the first embodiment is replaced with a microcomputer 60A which is connected to the ignition switch IG, A-D converters 50a to 50d, wave shaper 50e and relay 60 of the first embodiment and further connected to the A-D converter 50h, a back up source 60a of electricity, a driving circuit 180 and an A-D converter 190a. The microcomputer 60A comprises a read only memory or ROM which previously stores therein a main control program defined by flow diagrams respectively shown in FIGS. 10, 11 and 12 and further stores therein an interrupt control program defined by a flow diagram shown in FIG. 13. In operation, the microcomputer 60A performs the main and interrupt control programs in cooperation with the A-D converters 50a to 50d, wave shaper 50e, comparator 50g and A-D converter 50h to control the stepper motor 30a, relay 70, driving circuit 180 and A-D converter 190a, as described later. In the second embodiment, the microcomputer 60A comprises a back up RAM which always receives an electric power from back up source 60a of electricity to be ready for operation. In this case, the back up RAM acts as a usual random access memory. Furthermore, execution of the interrupt control program in this embodiment is initiated at each time when a timer in the microcomputer 60A completes measurement of the predetermined time, for instance, one (msec).

Figure 9:
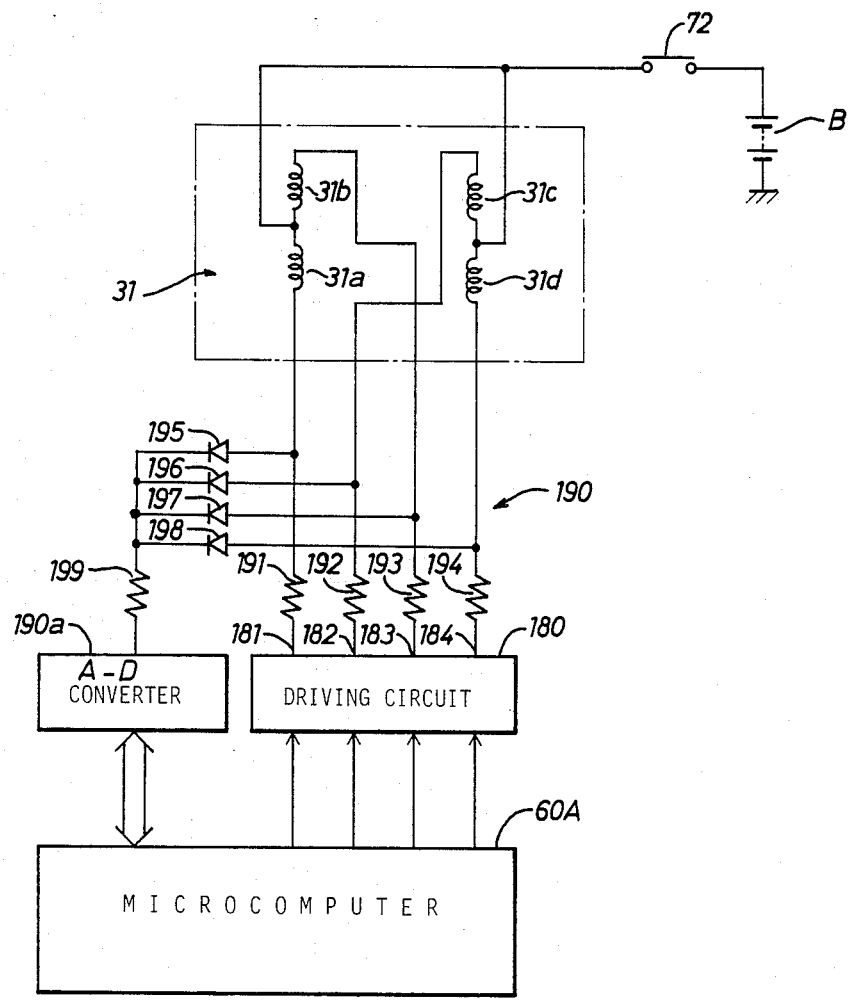
FIG. 9 illustrates the current detector and driving circuit in relation to the field windings of the stepper motor.

In the relay 70, the switch 72 is interposed between the plus terminal of the DC source B and each common terminal of field windings 31a, 31b and 31c, 31d of steppter motor 30a, as shown in FIGS. 7 and 9. The field windings 31a, 31b of stepper motor 30a are connected in series to each other, and the remaining field windings 31c, 31d are also connected in series to each other. The driving circuit 180 cooperates with the microcomputer 60A to generate at its output terminals 181, 182, 183 and 184 first, second, third and fourth driving signals for energizing the field windings 31a, 31b, 31c and 31d, respectively. In this case, the driving circuit 180 is responsive to first output signals applied thereto from microcomputer 60A to generate sequentially a pair of the third and fourth driving signals, a pair of the second and third driving signals, a pair of the first and second driving signals and a pair of the first and fourth driving signals. Conversely, the driving circuit 180 is responsive to second output signals applied thereto from microcomputer 60A to generate sequentially a pair of the first and fourth driving signals, a pair of the first and second driving signals, a pair of the second and third driving signals and a pair of the third and fourth driving signals.

As shown in FIGS. 7 and 9, a current detector 190 is connected between the driving circuit 180 and both the driving mechanism 30 and A-D converter 190a. The current detector 190 comprises a resistor 191 which is interposed between the field winding 31a of steppter motor 30a and the output terminal 181 of driving circuit 180 to permit flow of an electric current from the DC source B into the field winding 31a through the switch 72 of relay 70 in response to the first driving signal from driving circuit 180. A resistor 192 is interposed between the field winding 31c of stepper motor 30a and the output terminal 182 of driving circuit 180 to permit flow of the electric current from DC source B into the field winding 31c through the switch 72 in response to the second driving signal from driving circuit 180.

A resistor 193 is interposed between the field winding 31b of stepper motor 30a and the output terminal 183 of driving circuit 180 to permit flow of the electric current from DC source B into the field winding 31b through the switch 72 in response to the third driving signal from driving circuit 180. Furthermore, a resistor 194 is interposed between the field winding 31d of stepper motor 30a and the output terminal 184 of driving circuit 180 to permit flow of the electric current from DC source B into the field winding 31d through the switch 72 in response to the fourth driving signal from driving circuit 180. This means that in the stepper motor 30a, a pair of the field windings 31b, 31d; 31b, 31c; 31a, 31b or 31a, 31d are energized by the electric current from the DC source B to rotate the rotor 33 by one rotary step in the first or second rotational direction.

Diodes 195, 196, 197 and 198 are connected at their cathodes to an input terminal of A-D converter 190a through a resistor 199 for protection, as shown in FIG. 9. The diode 195 is connected at its anode to a junction of the field winding 31a and resistor 191 to be turned on in response to the first driving signal through resistor 191 from driving circuit 180 so as to permit flow of the electric current therethrough from field winding 31a to resistor 199. The diode 196 is connected at its anode to a junction of the field winding 31c and resistor 192 to be turned on in response to the second driving signal through resistor 192 from driving circuit 180 so as to permit flow of the electric current therethrough from the field winding 31c to resistor 199. The diode 197 is connected at its anode to a junction of the field winding 31b and resistor 193 to be turned on in response to the third driving signal through resistor 193 from driving circuit 180 so as to permit flow of the electric current therethrough from the field winding 31b to resistor 199. Furthermore, the diode 198 is connected at its anode to a junction of the field winding 31d and resistor 194 to be turned on in response to the fourth driving signal through resistor 194 from driving circuit 180 so as to permit flow of the electric current therethrough from the field winding 31d to resistor 199. In this case, the electric current flowing through resistor 199 corresponds to the electric current (hereinafter called as an electric current $I_s$) through switch 72 from the DC source B to the stepper motor 30a. The A-D converter 190a digitally converts the electric current from resistor 199 into a digital current to be applied to the microcomputer 60A. Other construction of the second embodiment is substantially the same as that of the first embodiment.

OPERATION

Figure 10:
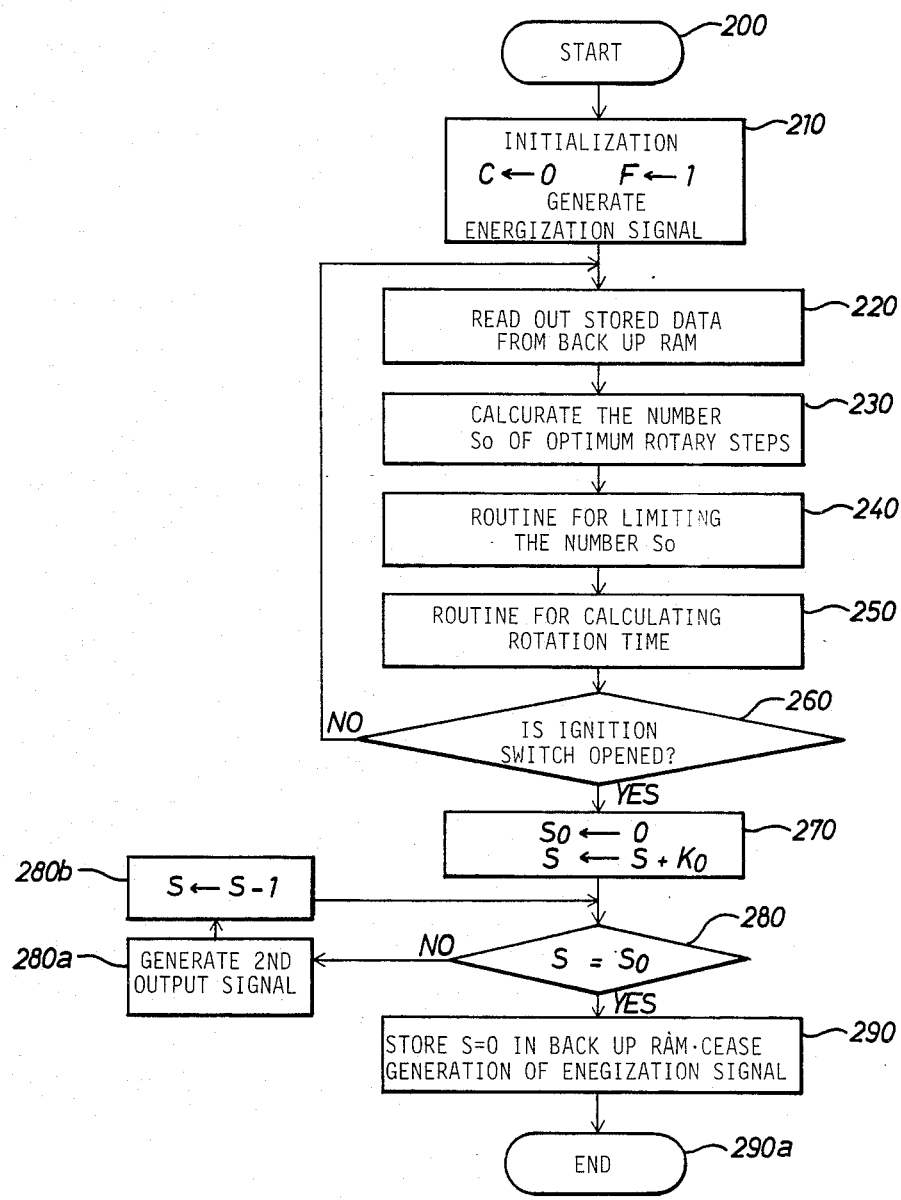
FIGS. 10 to 13 are flow diagrams defining the main and interrupt control programs to be performed by the microcomputer shown in FIG. 7.

When the ignition switch IG is closed to start the vehicle engine, as previously described in the first embodiment, the microcomputer 60A is ready for operation and starts execution of the main control program at step 200 of the flow diagram in FIG. 10 to be initialized at the following step 210. At this initialization, the microcomputer 60A clears a timer count data C equal to zero, resets a flag F equal to one and produces an energization signal for energizing the electromagnetic coil 71 of relay 70. In addition, the timer of microcomputer 60A starts measurement of the predetermined time in response to operation of microcomputer 60A and is reset upon completion of the measurement to restart the same measurement.

When the energization signal appears from the microcomputer 60A, the relay 70 permits power supply from the DC source B of electricity to the microcomputer 60A through the switch 72 in the same manner as that of the first embodiment. When the main control program proceeds to step 220, the microcomputer 60A reads out the number S of the actual rotary steps of stepper motor 30a and the number Ma of rotary step frequencies in driving of stepper motor 30a which were previously stored in the back up RAM of microcomputer 60A. In this case, the number S of the actual rotary steps has the same meaning as that of the first embodiment. The number Ma of rotary step frequencies indicates the total rotary steps of stepper motor 30a which has been driven at each rotary step till now after mounted on the carburetor 20. At this stage, it is assumed that S=0 and also that Ma=0. Thereafter, the main control program proceeds to step 230 at which the microcomputer 60A calculates the number S of optimum rotary steps of stepper motor 30a on a basis of the equation (1), described previously in the first embodiment, in the same manner as that at step 82 of the flow diagram in FIG. 4. In addition, the equation (1) and the basic map described previously in the first embodiment are previously stored in the ROM of microcomputer 60A.

Figure 11:
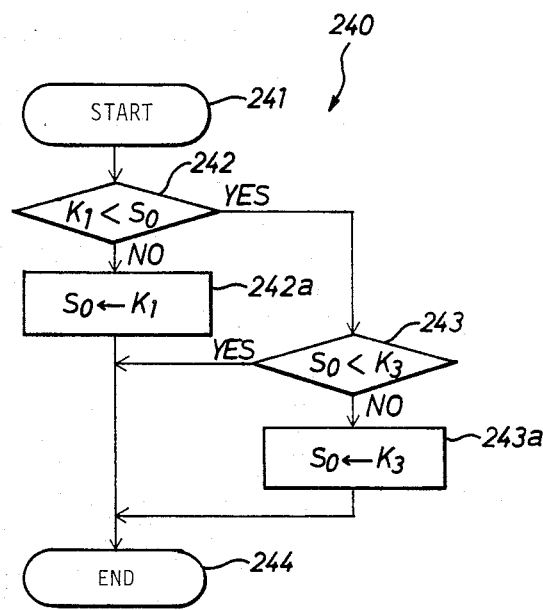

When the main control program proceeds to a routine 240 for limiting the number $S_o$ of optimum rotary steps in a predetermined range, as shown in FIGS. 10 and 11, the microcomputer 60A initiates execution of the routine 240 at step 241 of the flow diagram of FIG. 11. If the number $S_o$ of optimum rotary steps is maintained in a value between a lower limit value $K_1$ and an upper limit value $K_3$, the microcomputer 60A determines a "YES" answer sequentially at steps 242 and 243. If at this stage $S_o \leq K_1$, the microcomputer 60A determines a "NO" answer at step 242 to set $S_o$ to $K_1$ at step 242a. If conversely $S_o \geq K_3$, the microcomputer 60A determines a "YES" answer at step 242 and thereafter determines a "NO" answer at step 243 to set $S_o$ to $K_3$ at step 243a. In this embodiment, the lower limit value $K_1$ defines a minimum number $S_o$ of optimum rotary steps in usual operation of stepper motor 30a, which corresponds to the minimum length in displacement of plunger 30b from its original position, whereas the upper limit value $K_3$ defines a maximum number $S_o$ of optimum rotary steps in the usual operation of stepper motor 30a, which corresponds to the maximum length in displacement of plunger 30b from its original position. The lower and upper limit values $K_1$ and $K_3$ are previously stored in the ROM of microcomputer 60A.

Figure 12:
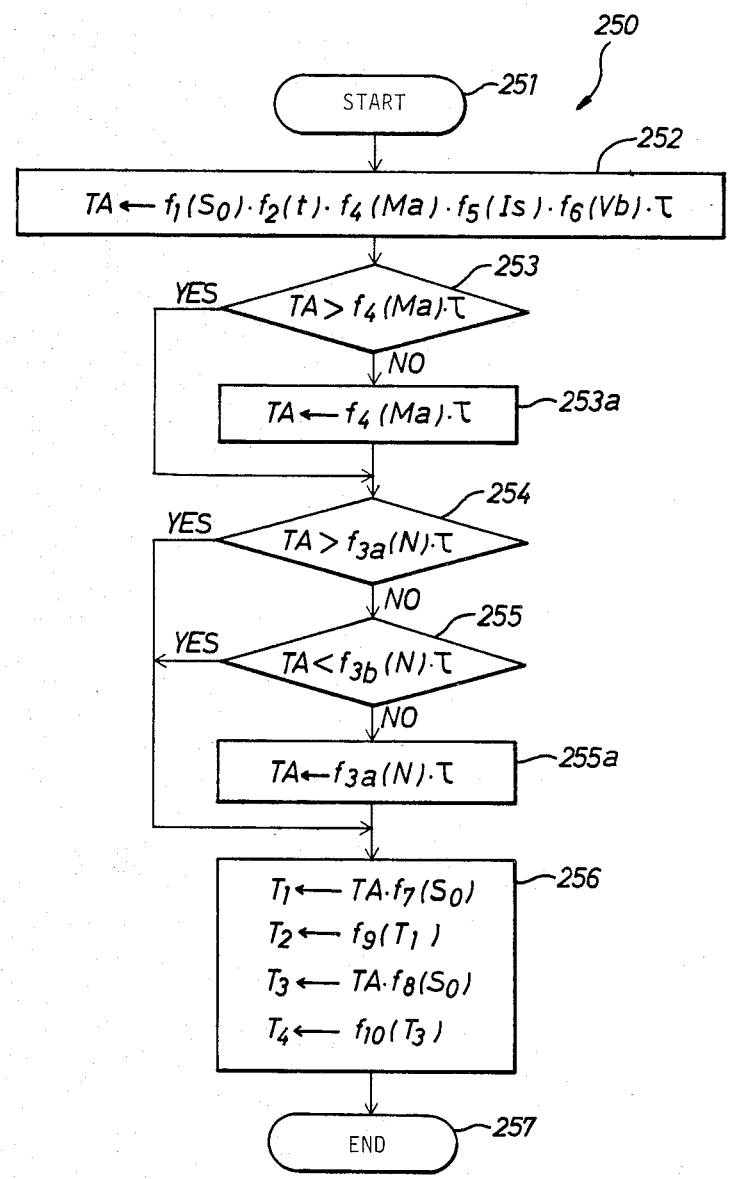

When the main control program proceeds through final step 244 of the routine 240 to a routine 250 for calculating a rotation time of stepper motor 30a, as shown in FIGS. 10 and 12, the microcomputer 60A starts execution of the routine 250 at step 251 of the flow diagram of FIG. 12 to calculate at step 252 a time duration $T_A$ for one rotary step of stepper motor 30a on a basis of the following equation (2) in accordance with modification coefficients $f_1(S_o)$, $f_2(t)$, $f_4(M_a)$, $f_5(I_s)$ and $f_6(V_b)$ and a basic time duration $\tau$, as follows.

$$T_A = f_1(S_o) \cdot f_2(t) \cdot f_4(M_a) \cdot f_5(I_s) \cdot f_6(V_b) \cdot \tau \qquad (2)$$

The modification coefficient $f_1(S_o)$ is determined on a basis of a characteristic curve $L_a$ (see FIG. 14) in accordance with the number $S_o$ of optimum rotary steps obtained at one of steps 230, 242a and 243a, and the modification coefficient $f_2(t)$ is determined on a basis of a characteristic curve $L_b$ (see FIG. 15) in accordance with a digital motor temperature signal from A-D converter 50h. The modification coefficient $f_4(M_a)$ is determined on a basis of a characteristic curve $L_e$ (see FIG. 17) in accordance with the number $M_a$ of rotary step frequencies read out at step 220, the modification coefficient $f_5(I_s)$ is determined on a basis of a characteristic curve $L_f$ (see FIG. 18) in accordance with a digital current from A-D converter 190a, and the modification coefficient $f_6(V_b)$ is determined on a basis of a characteristic curve $L_g$ (see FIG. 19) in accordance with the electric voltage through switch 72 of relay 70 from DC source B. Thereafter, the time duration $T_A$ is calculated on a basis of the equation (2) in accordance with the basic time duration $\tau$ and respectively determined modification coefficients $f_1(S_o)$, $f_2(t)$, $f_4(M_a)$, $f_5(I_s)$ and $f_6(V_b)$. In addition, the equation (2) is previously stored in the ROM of microcomputer 60A.

Figure 14:
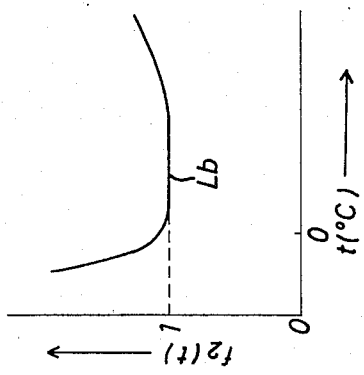
FIG. 14 depicts the characteristic curve $L_a$ defining a relationship between the coefficient $f_1(S_o)$ and the number $S_o$ of optimum rotary steps of the stepper motor.

In this case, the modification coefficient $f_1(S_o)$ is used to modify the basic time duration $\tau$ related to various loads of stepper motor 30a during operation of driving mechanism 30. The characteristic curve $L_a$ defines a relationship between the modification coefficient $f_1(S_o)$ and the number $S_o$ of optimum rotary steps, as shown in FIG. 14 and previously stored in the ROM of microcomputer 60A. In FIG. 14, the modification coefficient $f_1(S_o)$ is predetermined as a larger value in $0 \leq S_o \leq K_1$ to smoothly ensure the initial displacement of plunger 30b from its original position. Furthermore, the modification coefficient $f_1(S_o)$ changes inversely in proportion to the number $S_o$ of optimum rotary steps and takes one in $K_2 \leq S_o \leq K_3$. The reference character $K_2$ indicates a medium value of the number $S_o$ of optimum rotary steps in the usual operation of stepper motor 30a, which corresponds to a medium length in displacement of plunger 30b from its original position in its usual displacement range. In the embodiment, the medium value $K_2$ corresponds to a boundary between pillar-shaped and taper-shaped portions formed on the needle valve body 36 (see FIG. 3), and the upper limit value $K_3$ corresponds to an intermediate portion of the pillar-shaped portion of needle valve body 36. Furthermore, the basic time duration $\tau$ indicates a time, for instance 4 (msec), required for one rotary step of stepper motor 30a. The basic time duration $\tau$ is previously stored in the ROM of microcomputer 60A together with the medium value $K_2$.

Figure 15:
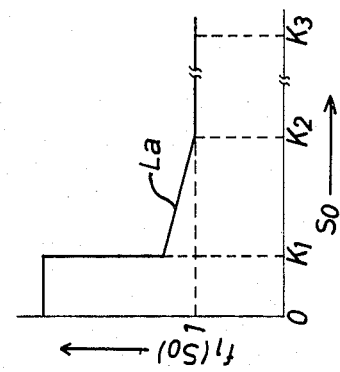
FIG. 15 depicts the characteristic curve $L_b$ defining a relationship between the modification coefficient $f_2(t)$ and the actual motor temperature t.
Figure 17:
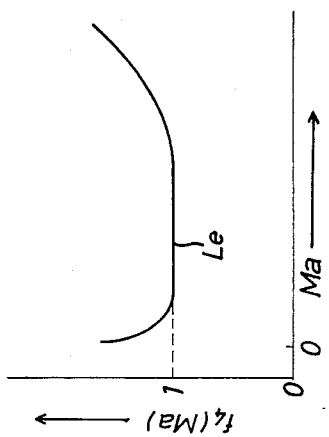
FIG. 17 illustrates the characteristic curve $L_e$ defining a relationship between the modification coefficient $f_4(M_a)$ and the number $M_a$ of rotary step frequencies in driving of the stepper motor.

The characteristic curve $L_b$ is defined by a relationship between the modification coefficient $f_2(t)$ and a temperature t of stepper motor 30a, as shown in FIG. 15, and is previously stored in the ROM of microcomputer 60A. The modification coefficient $f_2(t)$ is available for modifying the basic time duration $\tau$ related to changes in loads of stepper motor 30a dependent upon its temperature. As shown in FIG. 15, the modification coefficient $f_2(t)$ is predetermined to be larger, taking into account of an increase of loads which is caused by hardening of grease between revolving and stationary portions of driving mechanism 30 in $t < 0°$ C. and caused by flow of the grease apart from the revolving and stationary portions in a higher region of motor temperature t. The characteristic curve $L_e$ is defined by a relationship between the modification coefficient $f_4(M_a)$ and the number $M_a$ of rotary step frequencies, as shown in FIG. 17, and is previously stored in the ROM of microcomputer 60A. The modification coefficient $f_4(M_a)$ is available for modifying the basic time duration $\tau$ related to changes in loads of stepper motor 30a dependent on increase of its rotary step frequency. As shown in FIG. 17, the modification coefficient $f_4(M_a)$ is predetermined to be larger, taking into account of an increase of resistance in mechanical contact between the revolving and stationary portions of driving mechanism 30 in a smaller range of the number $M_a$ of rotary step frequencies, and abrasion in contact and deterioration of oil or grease between the revolving and stationary portions of driving mechanism 30 in a larger range of the number $M_a$ of rotary step frequencies.

Figure 19:
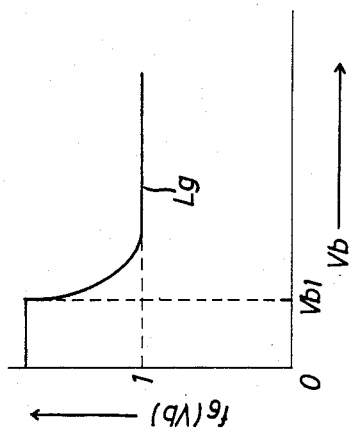
FIG. 19 depicts the characteristic curve $L_g$ defining a relationship between the modification coefficient $f_6(V_b)$ and the electric voltage $V_b$.
Figure 18:
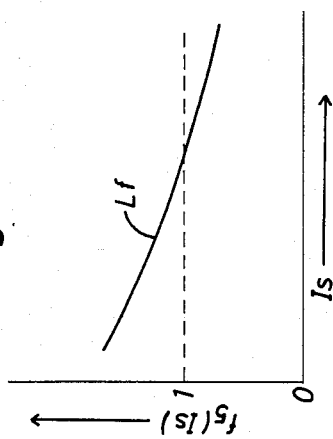
FIG. 18 depicts the characteristic curve $L_f$ defining a relationship between the modification coefficient $f_5(I_s)$ and the electric current $I_s$.

The characteristic curve $L_f$ is defined by an inversely proportional relationship between the modification coefficient $f_5(I_s)$ and the input current $I_s$ to stepper motor 30a, as shown in FIG. 18, and is previously stored in the ROM of microcomputer 60A. The modification coefficient $f_5(I_s)$ is available for modifying the basic time duration $\tau$ related to imbalance of the input current $I_s$ caused by imbalance in characteristic of stepper motor 30a. Furthermore, the characteristic curve $L_g$ is defined by a relationship between the modification coefficient $f_6(V_b)$ and the electric voltage (hereinafter called as the electric voltage $V_b$) from DC source B, as shown in FIG. 19, and is previously stored in the ROM of microcomputer 60A. The modification coefficient $f_6(V_b)$ is available for modifying the basic time duration $\tau$ related to fluctuation of an input voltage to the stepper motor 30a. As shown in FIG. 19, the modification coefficient $f_6(V_b)$ is predetermined to be larger when the electric voltage $V_b$ from the switch 72 of relay 70 is lower than or equal to the minimum voltage $V_{b1}$ necessary for driving the stepper motor 30a. In $V_b > V_{b1}$, the modification coefficient $f_6(V_b)$ decreases steeply to one.

When the routine 250 proceeds to step 253 from step 252, the microcomputer 60A determines a "YES" answer, if the time duration $T_A$ calculated at step 252 is longer than the product of the basic time duration $\tau$ and the modification coefficient $f_4(M_a)$ determined at step 252. If $T_A \leq f_4(M_a) \cdot \tau$, the microcomputer 60A determines a "NO" answer at step 253 to set $T_A = f_4(M_a) \cdot \tau$. Then, the routine 250 proceeds from one of steps 253 and 253a to step 254 at which the microcomputer 60A determines a modification coefficient $f_{3a}(N)$ on a basis of a characteristic curve Lc (see FIG. 16) in accordance with the rotational speed N calculated at step 230 and then calculates the product of the modification coefficient $f_{3a}(N)$ and the basic time duration $\tau$.

If the time duration $T_A$ calculated at one of steps 252 and 253a is longer than $f_{3a}(N)\cdot\tau$, the microcomputer 60A determines a "YES" answer at step 254. If the time duration $T_A$ is shorter than or equal to $f_{3a}(N)\cdot\tau$, the microcomputer 60A determines a "NO" answer at step 254 to advance the routine to step 255. Then, the microcomputer 60A determines a modification coefficient $f_{3b}(N)$ based on a characteristic curve $L_d$ (see FIG. 16) in accordance with the rotational speed N calculated at step 230, and in turn, calculates the product of the modification coefficient $f_{3b}(N)$ and basic time duration $\tau$. If the time duration $T_A$ calculated at one of steps 252 and 253a is shorter than $f_{3b}(N)\cdot\tau$, the microcomputer 60A determines a "YES" answer at step 255. Conversely, if $T_A \geq f_{3b}(N)\cdot\tau$, the microcomputer 60A determines a "NO" answer at step 255 to set $T_A = f_{3b}(N)\cdot\tau$ at step 255a.

Figure 16:
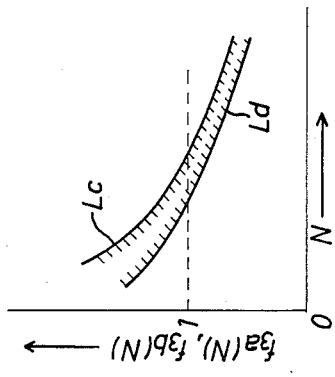
FIG. 16 represents the characteristic curve $L_c$ defining a relationship between the modification coefficient $f_{3a}(N)$ and the rotation speed N of the engine and the characteristic curve $L_d$ defining a relationship between the modification coefficient $f_{3b}(N)$ and the rotation speed N.

In the embodiment, the characteristic curve $L_c$ is defined by a relationship between the modification coefficient $f_{3a}(N)$ and rotational speed N, as shown in FIG. 16, whereas the characteristic curve $L_d$ is defined by a relationship between the coefficient $f_{3b}(N)$ and rotational speed N. These characteristic curves $L_c$, $L_d$ are previously stored in the ROM of microcomputer 60A. Both the modification coefficients $f_a(N)$ and $f_{3b}(N)$ are available respectively for modifying the basic time duration $\tau$ in order to prevent resonant phenomena between the driving mechanism 30 and engine 10. In this case, an area between the characteristic curves $L_c$, $L_d$ corresponds to an area in which the resonant phenomena are caused.

When the routine 250 proceeds to step 256, the microcomputer 60A determines a modification coefficient $f_7(S_o)$ based on a characteristic curve $L_h$ (see FIG. 20) in accordance with the number $S_o$ of optimum rotary steps calculated at step 230, calculates the product of the modification coefficient $f_7(S_o)$ and the time duration $T_A$ obtained at one of steps 252, 253a and 255a, and sets the product $T_A f_7(S_o)$ as an optimum time duration $T_1$ for one rotary step of stepper motor 30a in increase of the number S of the actual rotary steps. Thereafter, the microcomputer 60A determines an optimum reverse time duration $T_2$ based on a characteristic curve $L_j$ (see FIG. 21) in accordance with the optimum time duration $T_1$. In this case, the reverse time duration $T_2$ indicates a time for one reverse rotary step of stepper motor 30a in increase-to-decrease of the number S of the actual rotary steps.

Upon determining the reverse time duration $T_2$, the microcomputer 60A determines a modification coefficient $f_8(S_o)$ based on a characteristic curve $L_i$ (see FIG. 20) in accordance with the number S of optimum rotary steps calculated at step 230, calculates the product of the modification coefficient $f_8(S_o)$ and the time duration $T_A$ obtained at one of steps 252, 253a and 255a, and then sets the product $T_A f_8(S_o)$ as an optimum time duration $T_3$ for one rotary step of stepper motor 30a in decrease of the number S of the actual rotary steps. Subsequently, the microcomputer 60A determines an optimum reverse time duration $T_4$ based on a characteristic curve $L_k$ (see FIG. 22) in accordance with the optimum time duration $T_3$. In this case, the reverse time duration $T_4$ indicates a time for one reverse rotary step of stepper motor 30a in decrease-to-increase of the number S of the actual rotary steps.

Figure 20:
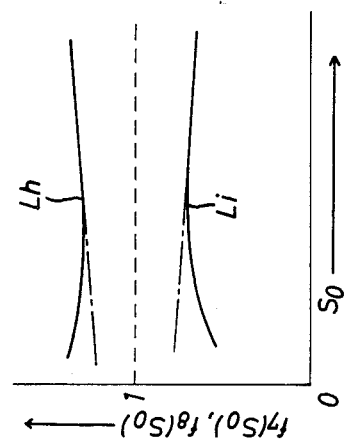
FIG. 20 represents the characteristic curve $L_h$ defining a relationship between the modification coefficient $f_7(S_o)$ and the number $S_o$ of optimum rotary steps and the characteristic curve $L_i$ defining a relationship between the modification coefficient $f_8(S_o)$ and the number $S_o$ of optimum rotary steps.
Figure 21:
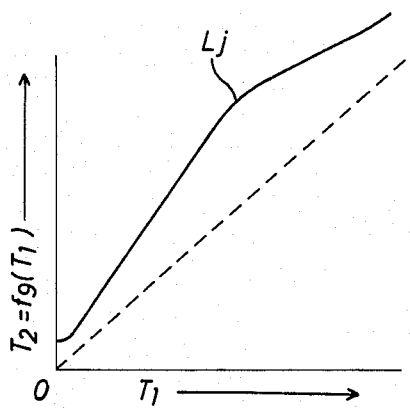
FIG. 21 depicts the characteristic curve $L_j$ defining a relationship between the time duration $T_2$ and the time duration $T_1$.
Figure 22:
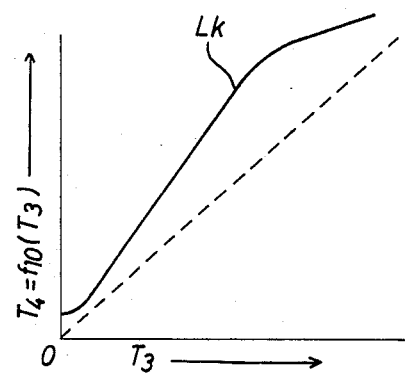
FIG. 22 depicts the characteristic curve $L_k$ defining a relationship between the time duration $T_4$ and the time duration $T_3$.

In the embodiment, the above-mentioned characteristic curve $L_h$ is defined by a relationship between the modification coefficient $f_7(S_o)$ and the number $S_o$ of optimum rotary steps, as shown in FIG. 20, whereas the above-mentioned characteristic curve $L_i$ is defined by a relationship between the modification coefficient $f_8(S_o)$ and the number $S_o$ of optimum rotary steps. The modification coefficient $f_7(S_o)$ is available for modifying the time duration $T_A$ related to load which acts on the stepper motor 30a due to the biasing force of coil spring 37 against the plunger 30b. In this case, the modification coefficient $f_7(S_o)$ is predetermined to be larger than one, as shown in FIG. 20. The modification coefficient $f_8(S_o)$ is available for modifying the time duration $T_A$ related to load which acts on the stepper motor 30a due to pressure difference between the upstream and downstream of valve seat 21g in the air bleed passage 21f when the number S of the actual rotary steps decreases. As shown in FIG. 20, the modification coefficient $f_8(S_o)$ is predetermined to be smaller than one. The above-mentioned characteristic curve $L_j$ is defined by a relationship between the optimum time duration $T_1$ and the optimum reverse rotation time $T_2 = f_9(T_1)$, as shown in FIG. 21, whereas the above-mentioned characteristic curve $L_k$ is defined by a relationship between the optimum time duration $T_3$ and the optimum reverse time duration $T_4 = f_{10}(T_3)$, as shown in FIG. 22. The characteristic curves $L_h$, $L_i$, $L_j$ and $L_k$ are previously stored in the ROM of microcomputer 60A.

Figure 13:
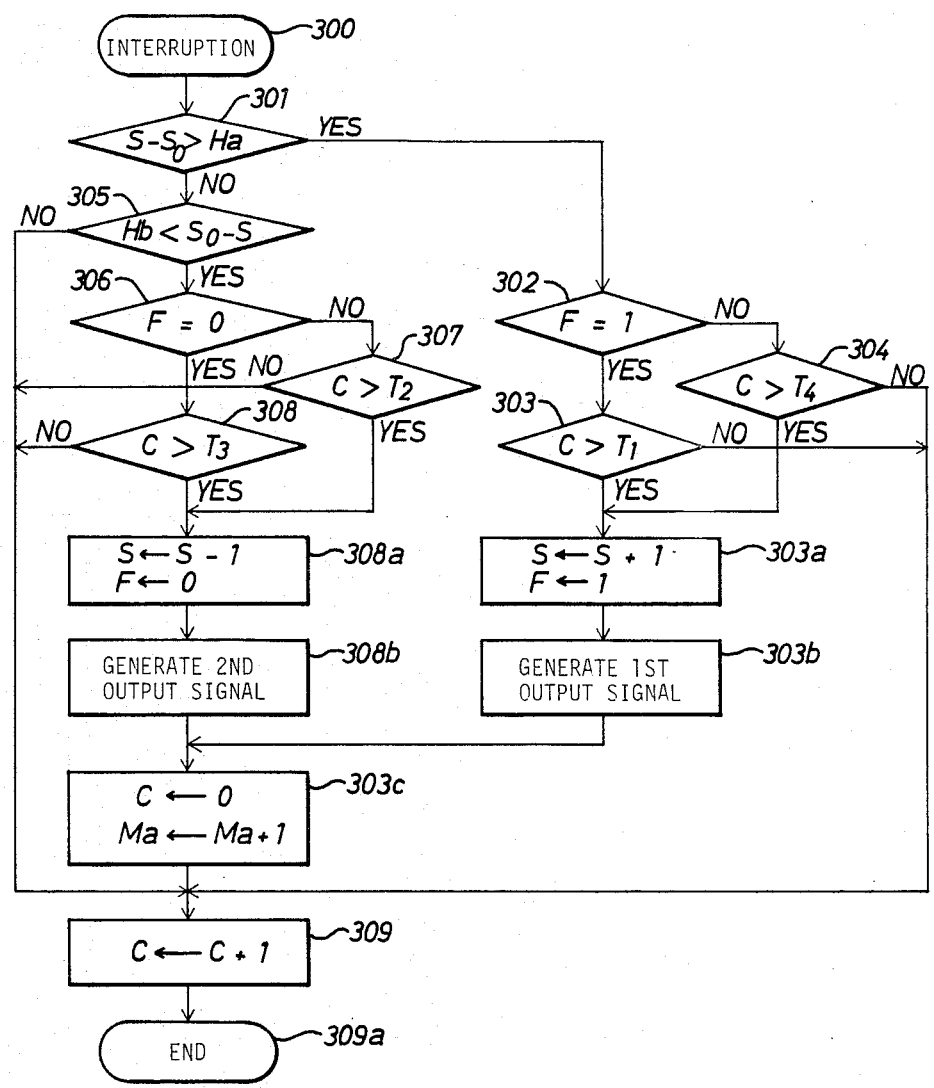

When the timer of microcomputer 60A completes measurement of the predetermined time after the microcomputer 60A determines a "NO" answer at step 260 of the main control program because of the electric voltage from the ignition switch IG, the microcomputer 60A starts execution of the interrupt control program at step 300 of the flow diagram in FIG. 13 to advance the interrupt control program to step 301. Then, the microcomputer 60A determines an upper limit value $H_a$ of a hysteresis width $\Delta H$ based on a characteristic curve $L_l$ (see FIG. 23) in accordance with the number $M_a$ of rotary step frequencies read out at step 220 and calculates a difference between the number S of the actual rotary steps read out at step 220 and the number $S_o$ of optimum rotary steps calculated at step 230. In addition, the timer of microcomputer 60A restarts measurement of the predetermined time upon its completion of the same measurement.

Figure 23:
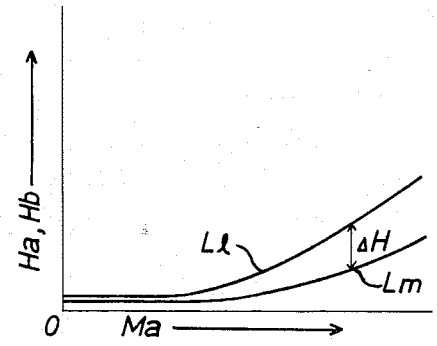
FIG. 23 illustrates the characteristic curve $L_l$ defining a relationship between the upper limit value $H_a$ and the number $M_a$ of rotary step frequencies and the characteristic curve $L_m$ defining a relationship between the lower limit value $H_b$ and the number $M_a$ of rotary step frequencies.

In this case, the characteristic curve $L_l$ is defined by a relationship between the upper limit value $H_a$ and the number $M_a$ of rotary step frequencies, as shown in FIG. 23. In this figure, the upper limit value $H_a$ and a lower limit value $H_b$ define the above-mentioned hysteresis width $\Delta H$ which is available for preventing hunting of stepper motor 30a. These limit values $H_a$, $H_b$ and hysteresis width $\Delta H$ are predetermined to increase in accordance with increase of the number $M_a$ of rotary step frequencies, taking into account of deterioration of stepper motor 30a in its driving. Furthermore, the lower limit value $H_b$ defines a characteristic curve $L_m$ in relation to the number $M_a$ of rotary step frequencies. The characteristic curve $L_m$ is previously stored in the ROM of microcomputer 60A together with the characteristic curve $L_l$.

If $(S - S_o) > H_a$ after execution as described above, the microcomputer 60A determines a "YES" answer at the same step 301. Then, the microcomputer 60A determines a "YES" answer at step 302 because of the flag F=1 set at step 210 to conversely determine a "NO"

answer at step 303 because of the timer count data C=0 at step 210. Thereafter, the microcomputer 60A increments the timer count data C by one at step 309 and sets the same data C to the incremented value and ends excution of the interrupt control program at step 309a. When the timer count data C incremented at step 309 exceeds the optimum time duration $T_1$ at step 256 during repetitive execution of the interrupt control program passing through steps 301, 302, 303 and 309, the microcomputer 60A determines a "YES" answer at step 303, increments the number S of the actual rotary steps by one at step 303a and sets the number S to the incremented value to set the flag F=1. Subsequently, the microcomputer 60A generates at step 303b a first output signal, as previously described in the first embodiment, clears the timer count data C=0 at step 303c and increments the number $M_a$ of rotary step frequencies to set the number $M_a$ to the incremented value. Thereafter, the microcomputer 60A updates the timer count data C at step 309a, as previously described.

When the first output signal appears from microcomputer 60A, as previously described, the stepper motor 30a is rotated by one rotary step in the first rotational direction to rotate the female screw portion 34 in the same direction so as to axially move the male screw portion 35 against the biasing force of coil spring 37. This increases the annular cross-sectional area between the valve body 36 and the valve seat 21g, as previously described. Thus, the bleed air flows from air cleaner 13 through the air bleed passage 21f and hole 29f into the metering jet 29e. As a result, fuel in the float chamber 23 is sucked into the intake conduit 21a through the fuel passage 23a, radial hole 29d and nozzle 28 in such a manner that the quantity of fuel is controlled in accordance with the quantity of bleed air.

Thereafter, the interrupt control program is repetitively performed through steps 301, 302, 303, 303a, 303b, 303c and 309 in relation to execution of the main control program of FIG. 10 such that a difference between the numbers S and $S_o$ of the actual and optimum rotary steps updated at steps 303a and 230 respectively is decreased down to an upper limit value $H_a$, updated newly at step 301, to increase the quantity of air bleed under control of driving mechanism 30. In other words, upon each lapse of the optimum time duration $T_1$ defined by repetitive determination of a "YES" answer at step 303, the microcomputer 60A performs the interrupt control program through the step 303a to generate the first output signal at step 303b. This means that one rotary step of microcomputer 60A stepper motor 30a in the first rotational direction under control of driving circuit 180 responsive to the first output signal is effective upon each lapse of the optimum time duration $T_1$.

From the above description, it will be understood that the optimum time duration $T_1$ is determined in relation to the basic time duration $\tau$ and respective modification coefficients $f_1(S_o)$, $f_2(t)$, $f_4(M_a)$, $f_5(I_s)$, $f_6(V_b)$ and $f_7(S_o)$ in respective determinations of "YES" at steps 253, 254 and 255 of routine 250. For this reason, the optimum time duration $T_1$ takes a larger value based on the modification coefficient $f_1(S_o)$ in relation to the characteristic curve $L_a$ (see FIG. 14) when $0 \leq S_o \leq K_1$. Thus, initial rotary motion of stepper motor 30a from its original position in the first rotational direction is smoothly effected in spite of bite between the revolving and stationary portions of driving mechanism 30. When $K_1 < S_o < K_3$, the optimum time duration $T_1$ decreases in accordance with decrease of the modification coefficient $f_1(S_o)$ based on the characteristic curve $L_a$. However, smooth rotary motion of stepper motor 30a in the first rotational direction is effected because loads acting on stepper motor 30a is still maintained in a small value immediately after the above-mentioned initial rotary motion of stepper motor 30a.

When the actual temperature t of stepper motor 30a is lower than or equal to 0° C., the optimum time duration $T_1$ takes a larger value based on the modification coefficient $f_2(t)$ in relation to the characteristic curve $L_b$ (see FIG. 15). This ensures smooth rotary motion of stepper motor 30a in the first rotational direction, in spite of hardening of the grease between the revolving and stationary portions of driving mechanism 30. When the actual temperature t of stepper motor 30a is maintained in a high value, the optimum time duration $T_1$ also takes a larger value based on the modification coefficient $f_2(t)$ related to the characteristic curve Lb. This ensures smooth rotary motion of stepper motor 30a in the first rotational direction in spite of flow of the grease apart from the revolving and stationary portions of driving mechanism 30.

When the number $M_a$ of rotary step frequencies is maintained in a small value, the optimum time duration $T_1$ takes a larger value based on the modification coefficient $f_4(M_a)$ related to the characteristic curve $L_e$ (see FIG. 17). This ensures smooth rotary motion of stepper motor 30a in the first rotational direction, in spite of undesired frictional resistance between the revolving and stationary portions of the driving mechanism 30 at its initial usage. When the number $M_a$ of driving frequencies is maintained in a large value, the optimum time duration $T_1$ also takes a larger value based on the coefficient $f_4(M_a)$ related to the characteristic curve $L_e$. This ensures smooth rotary motion of stepper motor 30a, in spite of abrasion powders between the revolving and stationary portions of driving mechanism 30.

When the electric current $I_s$ flowing into the stepper motor 30a is maintained in a large value, the optimum time duration $T_1$ takes a smaller value based on the modification coefficient $f_5(I_s)$ related to the characteristic curve $L_f$ (see FIG. 18). When the electric current $I_s$ decreased, the optimum time duration $T_1$ increases in accordance with increase of the modification coefficient $F_5(I_s)$ related to the characteristic curve $L_f$. This means that the optimum time duration $T_1$ increases (or decreases) in accordance with decrease (or increase) of the electric current $I_s$ to thereby ensure smooth rotary motion of stepper motor 30a in the first rotational direction. Even if the electric voltage Vb from DC source B is maintained below the minimum voltage $V_{b1}$, the optimum time duration $T_1$ takes a larger value based on the modification coefficient $f_6(V_b)$ related to the characteristic curve $L_g$ (see FIG. 19). Thus, the stepper motor 30a can be smoothly rotated in the first rotational direction, in spite of shortage of the electric voltage $V_b$ from DC source B. When $V_b > V_{b1}$, the optimum time duration $T_1$ decreases because of decrease of the modification coefficient $f_6(V_b)$ related to the characteristic curve $L_g$. However, the stepper motor 30a can be still rotated in the first rotational direction owing to the proper value of electric voltage $V_b$ from DC source B. When the number So of optimum rotary steps is maintained in a smaller or larger value, the optimum time duration $T_1$ takes a larger value based on the coefficient $f_7(S_o)$ related to the characteristic curve $L_h$ (see FIG. 20). Thus, the stepper motor 30a can be smoothly rotated in the first rotational direction, in spite of the biasing force of coil spring 37.

From the above description, it will be understood that in the above-described operation, the number S of the actual rotary steps is increased toward the number $S_o$ of optimum rotary steps, in spite of various loads acting on the stepper motor 30a. In other words, an increase in the quantity of bleed air flowing through air bleed passage 21f is more precisely controlled by the driving mechanism 30 in response to various changes of load condition of engine 10 and stepper motor 30a to adjust in a proper value an air-fuel ratio of the mixture. This is effective to decrease exhaust of noxious gases from engine 10 and the rate of fuel consumption and to enhance driveability of the vehicle. In this case, the stepper motor 30a is further prevented from its hunting, because the microcomputer 30a determines at step 301 whether or not $(S-S_o) > H_a$. If the determination at step 253 is a "NO" answer, the microcomputer 60A acts to set $T_A = f_4(M_a) \cdot \tau$ at step 253a and further to set $T_1 = f_4(M_a) \cdot \tau \cdot f_7(S_o)$ at step 256. This means that rotary motion of stepper motor 30a in the first rotational direction is effected without influence of the modification coefficients $f_1(S_o)$, $f_2(t)$, $f_5(I_s)$ and $f_6(V_b)$. If the determination at steps 254, 255 is a "NO" answer, the microcomputer 60A acts to set $T_A = f_{3a}(N) \cdot \tau$ at step 255a and further to set $T_1 = f_{3a}(N) \cdot \tau \cdot f_7(S_o)$. This prevents resonant phenomena of driving mechanism 30a with the engine 10.

When the determination at step 301 becomes a "NO" answer during the above-mentioned execution, the microcomputer 60A determines at step 305 a lower limit value $H_b$ based on the characteristic curve $L_m$ (see FIG. 23) in accordance with the number $M_a$ of rotary step frequencies updated newly at step 303c and then calculates a difference between the numbers $S_o$ and S of optimum and actual rotary steps updated newly at steps 230 and 303a respectively. If $(S_o - S) \leq H_b$ at this stage, the microcomputer 60A determines a "NO" answer at step 305. If $(S_o - S) > H_b$ conversely, the microcomputer 60A determines a "YES" answer at the same step 305. After this execution, the microcomputer 60A determines a "NO" answer at step 306 because of the flag $F=1$ set at step 303a and, in turn, determines a "NO" answer at step 307 in relation to the timer count data C and reverse time duration $T_2$ which has been updated at steps 309 and 256 respectively. When the determination at step 307 is inverted into a "YES" answer during repetitive execution of the interrupt control program passing through steps 301, 305, 306, 307, and 309, the interrupt control program proceeds to step 308a at which the microcomputer 60A decrements by one the number S of the actual rotary steps updated at step 303a, sets the number S to the decremented value, and resets the flag $F=0$. Subsequently, the microcomputer 60A generates at step 308b a second output signal, as previously described in the first embodiment, and then clears $C=0$ at step 303c. Thereafter, the microcomputer 60A updates the number $M_a$ of rotary step frequencies and the timer count data C at respective steps 303c and 309 in sequence, as previously described.

When the second output signal appears from microcomputer 60A, as previously described, the stepper motor 30a is rotated by one rotary step in the second rotational direction to rotate the female screw portion 34 in the same direction so as to axially move the male screw portion 35 in the biasing direction of coil spring 37. This decreases the annular cross-sectional area between the valve body 36 and the valve seat 21g. Thus, the quantity of bleed air flowing through the air bleed passage 21f decreases in accordance with decrease of the annular cross-sectional area between the valve body 36 and the valve seat 21g. In this instance, upon lapse of the reverse time duration $T_2$ defined by determination of a "YES" answer at step 307, the microcomputer 60A performs the interrupt control program through the step 308a to generate the second output signal at step 308b. This means that one rotary step of stepper motor 30a responsive to the second output signal in the second rotational direction is effected.

In this case, it should be noted that the microcomputer 60A performs the routine 250 through steps 252 to 255a to determine the time duration $T_A$, as previously described and further determines the reverse time duration $T_2(>T_1)$ based on the characteristic curve $L_j$ (see FIG. 21). Thus, the number S of actual rotary steps of stepper motor 30a is surely decreased toward the number $S_o$ of optimum rotary steps, in spite of various loads acting on the engine 10 and stepper motor 30a. As a result, a decrease in the quantity of bleed air flowing through the air bleed passage 21f is precisely controlled by the driving mechanism 30 in response to various changes of load condition of engine 10 and stepper motor 30a to adjust in a proper value an air-fuel ratio of the mixture.

When the determination at step 305 is inverted into a "YES" answer, the microcomputer 60A determines a "YES" answer at step 306 because of the flag $F=0$ reset at step 308a, and conversely determines a "NO" answer at step 308 in relation to the timer count data C and optimum time duration $T_3$ which were newly updated at steps 309 and 256 respectively. When the determination at step 308 becomes a "YES" answer during repetitive execution of the interrupt control program passing through steps 301, 305, 306 and 308, the microcomputer 60A updates the number S of the actual rotary steps at step 308a and resets the flag $F=0$, as previously described. Subsequently, the microcomputer 60A generates a second output signal at step 308b, as previously described, to advance the interrupt control program to step 303c. The execution of the interrupt control program as described above is repeated on a basis of the repetitive determination of a "YES" answer at step 305 to decrease the quantity of bleed air flowing through the air bleed passage 21f under control of driving mechanism 30.

In other words, upon each lapse of the optimum time duration $T_3$ defined by repetitive determination of a "YES" answer at step 308, the microcomputer 60A performs the interrupt control program passing through the step 308a to generate the second output signal at step 308b. This means that one rotary step of stepper motor 30a responsive to the second output signal in the second rotational direction is effected upon each lapse of the optimum time duration $T_3$. In this case, it should be noted that the microcomputer 60A performs the routine 250 passing through steps 252 to 255a to determine the time duration $T_A$, as previously described, and further determines the optimum time duration $T_3$ based on the time duration $T_a$ and the modification coefficient $f_8(S_o)$ related to the characteristic curve $L_i$ (see FIG. 20). Thus, the number S of the actual rotary steps is decreased toward the number $S_o$ of optimum rotary steps. As a result, decrease in the quantity of bleed air flowing through the air bleed passage 21f is more precisely controlled by the driving mechanism 30 in response to various changes of load condition of engine 10 and stepper motor 30a to adjust in a more proper value an air-fuel ratio of the mixture. This is effective to enhance driveability of the vehicle and to decrease exhaust of the noxious gases and the rate of fuel consumption. In addition, the stepper motor 30a is prevented from its hunting because the microcomputer 60A determines at step 305 whether or not $H_b < (S_o - S)$.

When the determination at step 301 is again inverted into a "YES" answer after the execution as described above, the microcomputer 60A determines a "NO" answer at step 302 based on the flag F=0 reset at step 308a and determines a "NO" answer at step 304 in relation to the timer count data C and reverse time duration $T_4$ which were newly updated at steps 309 and 256 respectively. When the determination at step 304 is inverted into a "YES" answer, the microcomputer 60A updates the number S of the actual rotary steps at step 303a and sets the flag F=1, as previously described. Then, the microcomputer 60A generates a first output signal at step 303b to advance the interrupt control program to step 303c.

When the first output signal appears from the microcomputer 60A, as previously described, the stepper motor 30a is rotated by one rotary step in the first rotational direction under control of driving circuit 180. Then, the male screw portion 35 displaces against biasing force of coil spring 37 to increase the annular cross-sectional area between the valve body 36 and valve seat 21g. This increases the quantity of bleed air flowing through the air bleed passage 21f. In other words, upon lapse of the reverse time duration $T_4$ defined by determination of a "YES" answer at step 304, the microcomputer 60A performs the interrupt control program through step 303a to generate the first output signal at step 303b. This means that one rotary step of the stepper motor 30a responsive to the first output signal in the first rotational direction is effected upon lapse of the reverse time duration $T_4$.

In this case, it should be noted that the microcomputer 60A performs the interrupt control program through steps 252 to 255a to determine the time duration $T_A$, as previously described, and further determines the reverse time duration $T_4(>T_3)$ based on the characteristic curve $L_k$ (see FIG. 22). This means that the rotary motion of motor 30a is reversed from the second rotational direction to the first rotational direction. As a result, decrease-to-increase control in the quantity of bleed air flowing through the air bleed passage 21f is precisely effected by the driving mechanism 30 in response to various changes of load condition of engine 10 and stepper motor 30a to maintain in a more proper value an air-fuel ratio of the mixture. This is effective to enhance driveability of the vehicle and to decrease exhaust of the noxious gases and the rate of fuel consumption. When the determination at step 302 becomes a "YES" answer because of the flag F=1 set at step 303a, the microcomputer 30A causes the interrupt control program to proceed to step 303.

When the ignition switch IG is opened after stop of the vehicle, the microcomputer 60A determines a "YES" answer at step 260 of the main control program of FIG. 10 due to disappearance of the electric voltage from the ignition switch IG. Then, at step 270 the microcomputer 60A clears the number $S_o$ of optimum rotary steps equal to zero, adds a constant $K_o$ to the number S of the actual rotary steps updated at one of steps 303a, 308a, and sets the added resultant value as the number S of the actual rotary steps. In this case, the constant $K_o$ is predetermined in a value necessary for effecting engagement of the valve body 36 with the valve seat 21g and is previously stored in the ROM of microcomputer 60A.

Thereafter, the microcomputer 60A determines a "NO" answer at step 280 based on $S \neq S_o$, generates a second output signal at step 280a and then decrements the number S of the actual rotary steps by one to set the number S to the decremented value. When the second output signal appears from microcomputer 60A, the stepper motor 30a is rotated in the second rotational direction to displace the plunger 30b toward its original position. Subsequently, the microcomputer 60A repetitively performs the main control program through steps 280, 280a and 280b to further rotate the stepper motor 30a in the second rotational direction so that the plunger 30b is further displaced to engage the valve body 36 with the valve seat 21g.

When the determination at step 280 is inverted into a "YES" answer due to the number S of the actual rotary steps updated newly at step 280b, the main control program proceeds to step 290 at which the microcomputer 60A stores in the back up RAM the number S (=0) of the actual rotary steps and the number $M_a$ of rotary step frequencies updates newly at step 303c and extinguishes the energization signal. Thus, the electromagnetic coil 71 of relay 70 is deenergized in response to disappearance of the energization signal to open the switch 72, and the microcomputer 60A ends operational procedure thereof at step 290a.

Figure 24:
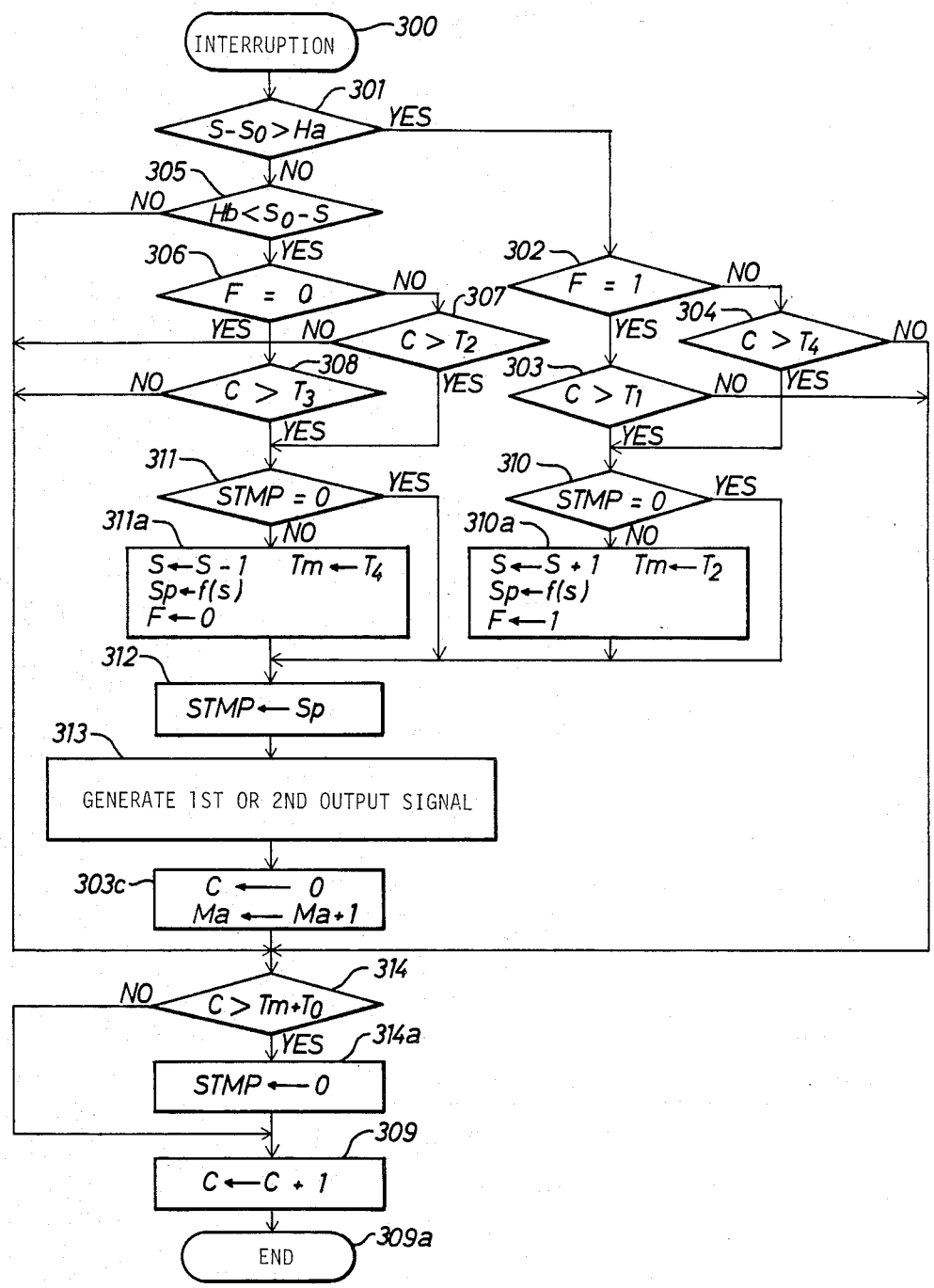
FIG. 24 is a flow diagram defining a modified interrupt control program to be executed by the microcomputer in FIG. 7.

FIG. 24 illustrates a modification of the second embodiment in which a modified interrupt control program shown in FIG. 24 is previously stored in the ROM of microcomputer 60A. Other construction of the modification is substanitally the same as that of the second embodiment.

When the determination at step 303 (see FIGS. 13 and 24) is a "YES" answer, as previously described, the microcomputer 60A determines a "NO" answer at step 310 (see FIG. 24), if a position data STMP updated previously at step 314a is not equal to zero. In this case, the position data STMP indicates an optimum step position of stepper motor 30a. Then, the modified interrupt control program proceeds to step 310a at which the microcomputer 60A increments by one the number S of the actual rotary steps to set the number S to the incremented value. In this modification, it is assumed that the number S of the actual rotary steps is a binary number. Subsequently, at the same step 310a the microcomputer 60A sets the two low-order positions f(s) of the number S of the actual rotary steps to a step position SP of stepper motor 30a, sets the flag F=1 and further sets to data $T_m$ the reverse time duration $T_2$ which is newly updated at step 256 (see FIG. 12) in the second embodiment.

In the modification, the position data STMP is defined relative to the step position SP, as shown in the following table (1).

TABLE 1

| S | P | STMP | | | |
|---|---|---|---|---|---|
|   |   | φ1 | φ2 | φ3 | φ4 |
| 0 | 0 | 0 | 0 | 1 | 1 |
| 0 | 1 | 0 | 1 | 1 | 0 |
| 1 | 0 | 1 | 1 | 0 | 0 |
| 1 | 1 | 1 | 0 | 0 | 1 |

In the table (1), SP=(0, 0) corresponds to STMP=($\phi_1$, $\phi_2$, $\phi_3$, $\phi_4$)=(0, 0, 1, 1), and SP=(0, 1) corresponds to STMP=(0, 1, 1, 0). SP=(1, 0) corresponds to STMP=(1, 1, 0, 0), and SP=(1, 1) corresponds to STMP=(1, 0, 0, 1). Furthermore, $\phi_1=1$ (or 0) corresponds to appearance (or disappearance) of the first driving signal from driving circuit 180, $\phi_2=1$ (or 0) corresponds to appearance (or disappearance) of the second driving signal from driving circuit 180, $\phi_3=1$ (or 0) corresponds to appearance (or disappearance) of the third driving signal from driving circuit 180, and $\phi_4=1$ (or 0) corresponds to appearance (or disappearance) of the fourth driving signal from driving circuit 180. In addition, STMP=(0, 0, 0, 0)=0 corresponds to deenegized or inoperative condition of stepper motor 30a.

With the proceeding of the modified interrupt control program to step 312, the microcomputer 60A sets to the position data STMP the step position SP set at step 310a and, in turn, generates at the following step 313 a first output signal indicative of the position data STMP which corresponds to the first output signal previously described in the second embodiment. Then, the stepper motor 30a cooperates with the driving circuit 180 responsive to the first output signal from microcomputer 60A to be rotated by one rotary step in the first rotational direction so as to increase the quantity of bleed air, as previously described. In other words, an increase in the quantity of bleed air is effected by shift of the corresponding step position SP and position data STMP from an upper row to a lower row in the table (1).

Figure 25:
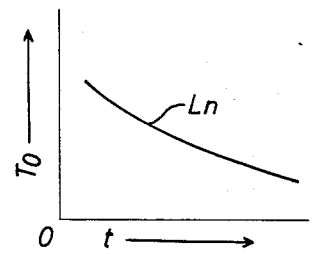
FIG. 25 depicts the characteristic curve $L_n$ defining a relationship between the stable time duration $T_o$ and the actual motor temperature t.

Thereafter, the microcomputer 60A determines at step 314 a stable time duration $T_o$ based on a characteristic curve $L_n$ (see FIG. 25) in accordance with a digital motor temperature signal from A-D converter 50h. In this case, the stable time duration $T_o$ indicates a time duration in which the stepper motor 30a will operate in a stable condition. The characteristic curve $L_n$ is defined by a relationship between the stable time duration $T_o$ and the actual motor temperature t which are substantially in inverse proportion to each other. This characteristic curve $L_n$ is previously stored in the ROM of microcomputer 60A.

Upon determining the stable time duration $T_o$, as previously described, the microcomputer 60A calculates at the same step 314 addition of the stable time duration $T_o$ with the data $T_m$ set at step 310a and determines a "NO" answer if $C > T_m + T_o$. If $C \leq T_m + T_o$, the microcomputer 60A determines a "YES" answer at the same step 314 to set STMP=0 at step 314a. When the determination at step 310 is inverted into a "YES" answer on a basis of STMP=0 set at step 314a, the microcomputer 60A sets to the position data STMP the step position SP which was already set at step 310a prior to the determination of "YES" at step 310. This means that the position data STMP set at step 312 is unchanged before and after the determination of "YES" at step 310. As a result, the stepper motor 30a is held in the same step position.

In this case, the stable time duration $T_o$ is decreased on a basis of the characteristic curve $L_n$ in accordance with the increase of the actual motor temperature t to shorten time interval in repetitive determination of a "YES" answer at step 314. Thus, time duration and frequency in a stationary condition of stepper motor 30a are increased to restrain undesired rise of the actual motor temperature t of stepper motor 30a. The abovementioned operation and effect may be also attained when the microcomputer 30a determines a "YES" answer at one of steps 304, 307 and 308. Additionally, the microcomputer 30a sets the reverse time duration $T_4$ to the data $T_m$, if the determination at step 311 is a "NO" answer. Other operation and effect are the same as those in the second embodiment.

Although in the second embodiment the characteristic curves $L_l$, $L_m$ are respectively defined in relation to the number $M_a$ of rotary step frequencies, as shown in FIGS. 17 and 23, they may be also respectively defined in relation to the number $M_b$ of reversing frequencies of stepper motor 30a in replacement of the number $M_a$.

While in the embodiments and modification the present invention is adapted to the variable venturi type carburetor 20, it may be also adapted to a fixed venturi type carburetor.

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. An electric control apparatus for a carburetor adapted to internal combustion engines, said carburetor having a body formed therein with an intake conduit, a flow control element axially movable within a passage such as an air bleed passage in said body for controlling the cross-sectional area of said passage in accordance with axial displacement thereof, and a stepper motor mounted on said body for effecting the axial displacement of said flow control element, the electric control apparatus comprising:

first means for producing a first electric signal indicative of the operating condition of said engine;

second means responsive to said first electric signal for determining rotary steps of said stepper motor for controlling the cross-sectional area of said passage in an optimum value in relation to the operating condition of said engine;

third means for determining whether or not the number of said determined rotary steps is more than the actual rotary steps of said stepper motor, if so producing a first command signal and if not, producing a second command signal; and fourth means responsive to said first command signal for producing a first control signal for effecting one rotary step of said stepper motor in a direction defined by said first command signal and further responsive to said second command signal for producing a second control signal for effecting one rotary step of said stepper motor in the other direction defined by said second command signal;

wherein said control apparatus further comprises:

fifth means responsive to one of said control signals for determining a first time duration for one rotary step of said stepper motor in consideration with loads acting on said stepper motor and for producing a first time signal upon lapse of the first time duration;

sixth means responsive to change of one of said command signals to the other command signal for determining a second time duration for one reverse rotary step of said stepper motor in consideration with loads acting on said stepper motor and for producing a second time signal upon lapse of the second time duration; and means responsive to one of said first and second time signals for selectively applying said control signals to said stepper motor.

2. An electric control apparatus as claimed in claim 1, further comprising:

a source of electricity for producing an electric voltage to be applied to said stepper motor;

means for determining, in dependence upon said electric voltage, a modification coefficient based on first predetermined data representing a relationship between said electric voltage and said modification coefficient, said first data being arranged to increase or decrease said modification coefficient in accordance with a drop or a rise of said electric voltage;

means for multiplying the first time duration by said determined modification coefficient; and means for determining, in dependence upon the multiplied value, a third time duration based on second predetermined data representing a relationship between said multiplied value and the third time duration, said second data being arranged to maintain the third time duration larger than said multiplied value and to increase or decrease the third time duration in accordance with increase or decrease of said multiplied value;

wherein said fifth means is arranged to measure said multiplied value in response to one of said control signals so as to produce a first time signal upon lapse of a time defined by said multiplied value; and wherein said sixth means is arranged to measure the determined third time duration in response to change of one of said command signals to the other command signal and to produce a second time signal upon lapse of the determined third time duration.

3. An electric control apparatus as claimed in claim 1, further comprising:

means for producing a second electric signal indicative of the actual temperature of said stepper motor;

means for determining, in dependence upon a value of said second electric signal, a modification coefficient based on first predetermined data representing a relationship between the actual motor temperature and said modification coefficient, said first data being arranged to maintain said modification coefficient in a large value when the actual motor temperature is in a low or high range and to maintain said modification coefficient in a small value when the actual motor temperature is in an intermediate range;

means for multiplying the first time duration by said determined modification coefficient; and means for determining, in dependence upon said multiplied value, a third time duration based on second predetermined data representing a relationship between said multiplied value and the third time duration, said second data being arranged to maintain the third time duration larger than said multiplied value and to increase or decrease the third time duration in accordance with increase or decrease of said multiplied value;

wherein said fifth means is arranged to measure said multiplied value in response to one of said control signals so as to produce a first time signal upon lapse of a time defined by said multiplied value; and wherein said sixth means is arranged to measure the determined third time duration in response to change of one of said command signals to the other command signal and to produce a second time signal upon lapse of the determined third time duration.

4. An electric control apparatus as claimed in claim 1, further comprising:

means for determining, in dependence upon the number of said determined rotary steps, a modification coefficient based on first predetermined data representing a relationship between the number of said determined rotary steps and said modification coefficient, said first data being arranged to increase or decrease said modification coefficient in accordance with decrease or increase in the number of said determined rotary steps;

means for multiplying the first time duration by said determined modification coefficient; and means for determining, in dependence upon said multiplied value, a third time duration based on second predetermined data representing a relationship between said multiplied value and the third time duration, said second data being arranged to maintain the third time duration larger than said multiplied value and to increase or decrease the third time duration in accordance with increase or decrease of said multiplied value;

wherein said fifth means is arranged to measure said multiplied value in response to one of said control signals so as to produce a first time signal upon lapse of a time defined by said multiplied value; and wherein said sixth means is arranged to measure the determined third time duration in response to change of one of said command signals to the other command signal and to produce a second time signal upon lapse of the determined third time duration.

5. An electric control apparatus as claimed in claim 1, further comprising:

a source of electricity;

means for producing a second electric signal indicative of an electric current to be applied to said stepper motor from said source of electricity;

means for determining, in dependence upon a value of said second electric signal, a modification coefficient based on first predetermined data representing a relationship between said electric current and said modification coefficient, said first data being arranged to increase or decrease said modification coefficient in accordance with decrease or increase of said electric current;

means for multiplying the first time duration by said determined modification coefficient; and means for determining, in dependence upon said multiplied value, a third time duration based on second predetermined data representing a relationship between said multiplied value and the third time duration, said second data being arranged to maintain the third time duration larger than said multiplied value and to increase or decrease the third time duration in accordance with increase or decrease of said multiplied value;

wherein said fifth means is arranged to measure said multiplied value in response to one of said control signals so as to produce a first time signal upon lapse of a time defined by said multiplied value; and wherein said sixth means is arranged to measure the determined third time duration in response to change of one of said command signals to the other command signal and to produce a second time signal upon lapse of the determined third time duration.

6. An electric control apparatus as claimed in claim 1, further comprising:

means for accumulating the number of rotary step frequencies in driving of said stepper motor;

means for determining, in dependence upon the number of said accumulated rotary step frequencies, a modification coefficient based on first predetermined data representing a relationship between the number of rotary step frequencies and said modification coefficient, said first data being arranged to maintain said modification coefficient in a large value when the number of rotary step frequencies is in a small or large range and to maintain said modification coefficient in a small value when the number of rotary step frequencies is in an intermediate range;

means for multiplying the first time duration by said determined modification coefficient; and means for determining, in dependence upon said multiplied value, a third time duration based on second predetermined data representing a relationship between said multiplied value and the third time duration, said second data being arranged to maintain the third time duration larger than said multiplied value and to increase or decrease the third time duration in accordance with increase or decrease of said multiplied value;

wherein said fifth means is arranged to measure said multiplied value in response to one of said control signals so as to produce a first time signal upon lapse of a time defined by said multiplied value; and wherein said sixth means is arranged to measure the determined third time duration in response to change of one of said command signals to the other command signal and to produce a second time signal upon lapse of the determined third time duration.

7. An electric control apparatus for a carburetor adapted to internal combustion engines, said carburetor having a body formed therein with an intake conduit, a flow control element axially movable within a passage such as an air bleed passage in said body for controlling the cross-sectional area of said passage in accordance with axial displacement thereof, and a stepper motor having a stator mounted on said body, a rotor supported rotatably in said stator and supporting said flow control element in a screwed engagement therewith to effect the axial displacement of said flow control element, and resilient means assembled within said stator for axially biasing said flow control element toward said passage, the electric control apparatus comprising:

means for producing an electric signal indicative of the operating condition of said engine;

means responsive to said electric signal for determining rotary steps of said stepper motor for controlling the cross-sectional area of said passage in an optimum value in relation to the operating condition of said engine;

means for determining whether or not the number of said determined rotary steps is more than the actual rotary steps of said stepper motor and if so, producing a first command signal and if not, producing a second command signal; and means responsive to said first command signal for producing a first control signal for effecting one forward rotary step of said stepper motor against the biasing force of said resilient means and further responsive to said second command signal for producing a second control signal for effecting one reverse rotary step of said stepper motor under the biasing force of said resilient means;

wherein said control apparatus further comprises:

means for determining, in dependence upon the number of said determined rotary steps, a first modification coefficient based on first predetermined data representing a relationship between the number of said determined rotary steps and said first modification coefficient, said first data being arranged to maintain said first modification coefficient in a large value when the number of said determined rotary steps is in a small or large range and to maintain said first modification coefficient in a small value when the number of said determined rotary steps is in an intermediate range;

means for multiplying a first time duration for one rotary step of said stepper motor by said determined first modification coefficient;

means for determining, in dependence upon said multiplied value, a second time duration based on second predetermined data representing a relationship between the multiplied value and the second time duration, said second data being arranged to maintain the second time duration larger than said multiplied value and to increase or decrease the second time duration in accordance with increase or decrease of said multiplied value;

means for determining, in dependence upon the number of said determined rotary steps, a second modification coefficient based on third predetermined data representing a relationship between the number of said determined rotary steps and said second modification coefficient, said third data being arranged to maintain said second modification coefficient in a small value when the number of said determined rotary steps is in the small or large range and to maintain said second modification coefficient in a large value when the number of said determined rotary steps is in the intermediate range;

means for multiplying the first time duration by said determined second modification coefficient;

means for determining, in dependence upon said second-named multiplied value, a third time duration based on fourth predetermined data representing a relationship between said second-named multiplied value and the third time duration, said fourth data being arranged to maintain the third time duration larger than said second-named multiplied value and to increase or decrease the third time duration in accordance with increase or decrease of said second-named multiplied value;

means responsive to one of said control signals for measuring one of said multiplied values to produce one of first and second time signals upon lapse of one of said multiplied values;

means responsive to change of said first command signal to said second command signal for measuring the determined second time duration to produce a third time signal upon lapse of the determined second time duration;

means responsive to change of said second command signal to said first command signal for measuring the determined third time duration to produce a fourth time signal upon lapse of the determined third time duration; and means responsive to one of said first and fourth time signals for applying said first control signal to said stepper motor and further responsive to one of said second and third time signals for applying said second control signal to said stepper motor.

* * * * *